(12) United States Patent
Sakaue

(10) Patent No.: US 7,689,050 B2
(45) Date of Patent: Mar. 30, 2010

(54) IMAGE PROCESSING APPARATUS AND METHOD WITH A HISTOGRAM OF THE EXTRACTED DC COMPONENTS

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 11/400,265

(22) Filed: Apr. 10, 2006

(65) Prior Publication Data

US 2007/0071334 A1  Mar. 29, 2007

(30) Foreign Application Priority Data

Apr. 12, 2005 (JP) .............................. 2005-114771

(51) Int. Cl.
*G06K 9/36* (2006.01)
(52) U.S. Cl. ...................................... 382/239
(58) Field of Classification Search .................. 382/239
See application file for complete search history.

(56) References Cited

U.S. PATENT DOCUMENTS

| | | | |
|---|---|---|---|
| 4,339,745 A * | 7/1982 | Barber et al. ............... | 382/172 |
| 5,706,368 A | 1/1998 | Mita .......................... | 382/284 |
| 5,764,807 A * | 6/1998 | Pearlman et al. ........... | 382/240 |
| 5,988,504 A * | 11/1999 | Smitt ......................... | 382/237 |
| 5,995,665 A * | 11/1999 | Maeda ....................... | 382/232 |
| 6,058,210 A * | 5/2000 | de Queiroz et al. ......... | 382/232 |
| 6,556,693 B1* | 4/2003 | Dobashi et al. ............. | 382/112 |
| 2003/0210411 A1* | 11/2003 | Sawada ...................... | 358/1.9 |
| 2004/0047504 A1* | 3/2004 | Suzuki et al. ............... | 382/166 |
| 2004/0197021 A1* | 10/2004 | Huang et al. ................ | 382/162 |
| 2005/0036160 A1* | 2/2005 | Goto et al. .................. | 358/1.9 |
| 2005/0237410 A1* | 10/2005 | Shiohara ................ | 348/333.01 |

FOREIGN PATENT DOCUMENTS

| | | | |
|---|---|---|---|
| JP | 4-223774 | | 8/1992 |
| JP | 09093438 A | * | 4/1997 |
| JP | 2000-22971 | | 1/2000 |
| JP | 2003-274175 | | 9/2003 |

OTHER PUBLICATIONS

Japanese Official Communication dated Jan. 11, 2008, regarding Application No. 2005-114771.

* cited by examiner

*Primary Examiner*—Wenpeng Chen
(74) *Attorney, Agent, or Firm*—Fitzpatrick, Cella, Harper & Scinto

(57) ABSTRACT

An image processing apparatus extracts DC components of an image, generates a histogram of the extracted DC components, and detects a background level of the image based on the histogram.

17 Claims, 25 Drawing Sheets

IMAGE PROCESSING APPARATUS AND METHOD WITH A HISTOGRAM OF THE EXTRACTED DC COMPONENTS

FIELD OF THE INVENTION

The present invention relates to an image processing apparatus and method and, more particularly, to image processing for detecting the background of an image.

BACKGROUND OF THE INVENTION

Image processing that removes the background color included in an original image is known. In this processing, the luminance (or density) histogram of an image scanned by a scanner is generated, and the background signal level (to be referred to as "background level" hereinafter) of the original image is detected based on the histogram. The background level is subtracted from an image signal, thus removing the background from the image (to be referred to as "background removal" hereinafter).

Japanese Patent Laid-Open No. 2000-022971 discloses a technique which calculates a background removal amount according to the signal level of an image signal and varies the background removal amount according to the signal level of the image signal in place of simply subtracting the background level from the image signal.

However, in these techniques, when all pixels of an original image are selected to generate a histogram, a huge memory capacity is required. For this reason, it is a common practice to use discretely sampled pixels to generate a histogram. As a result, the histogram is readily influenced by a dust image or noise included in the original image, and the background cannot be accurately read.

When the background level is determined based on the luminance (or density) distribution pattern after the histogram is generated, and that of a clip or the like of a newspaper or magazine pasted on a white sheet is to be detected, white of the white sheet is detected as a background, and the background of the clip to be originally removed cannot be removed.

SUMMARY OF THE INVENTION

The first aspect of the present invention discloses an image processing apparatus comprising an extractor arranged to extract DC components of an image, a generator arranged to generate a histogram of the DC components extracted by the extractor, and a detector arranged to detect a background level of the image based on the histogram.

The second aspect of the present invention discloses an image processing apparatus comprising an encoder arranged to encode an image by computing orthogonal transforms of respective image blocks each including a predetermined number of pixels, a generator arranged to generate a histogram based on direct-current components of orthogonal transform coefficients of the image blocks, and a detector arranged to detect a background level of the image based on the histogram.

According to the present invention, the background of an image can be accurately detected.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Image processing according to an embodiment of the present invention will be described in detail hereinafter with reference to the accompanying drawings.

First Embodiment

Arrangement of Processing

Figure 1:
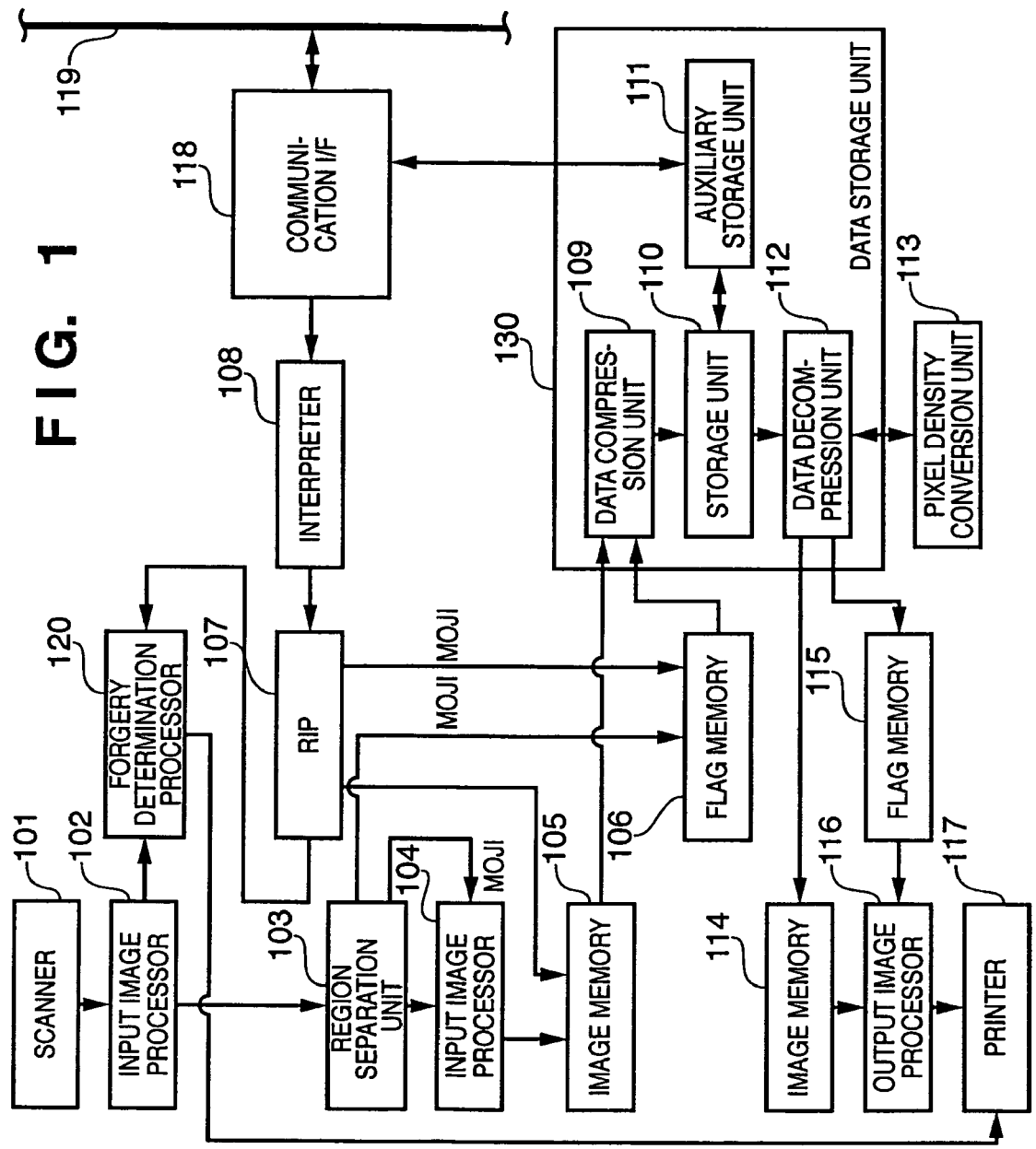
FIG. 1 is a block diagram for explaining the arrangement of image processing according to an embodiment of the present invention.

FIG. 1 is a block diagram for explaining the arrangement of image processing according to this embodiment.

Processing of Scanned Image

A scanner 101 scans an image of an original placed on an original platen glass. The scanner 101 digitally scans an original image for respective pixels using a 3-line CCD, and outputs its RGB color image signals. An input image processor 102 applies known image processing such as shading correction, inter-CCD line correction, color correction, and the like to the color image signal output from the scanner 101.

A region separation unit 103 applies region separation processing to the color image signal which is output from the input image processor 102 and has undergone the input image processing, as will be described in detail later. The region separation unit 103 detects features of images such as a photo region, text region, halftone dot region, and so forth for respective pixels of the input image, and generates flag data indicating an attribute for each region.

An input image processor 104 applies image processing for each pixel to the color image signal output from the input image processor 102 based on a text signal MOJI which is output for each pixel from the region separation unit 103. This image processing includes edge emphasis processing for emphasizing the sharpness of a character by emphasizing high-frequency components of a text region (MOJI='1'), and low-pass filter processing for removing moiré components unique to a digital image from a halftone dot region (MOJI='0').

The image data processed by the input image processor 104 is temporarily stored in an image memory 105, and the flag data output from the region separation unit 103 are temporarily stored in a flag memory 106. The image memory 105 and flag memory 106 store data for one page of an original document or for a predetermined size (band size) of one page.

A data compression unit 109 compresses the data temporarily stored in the image memory 105 and flag memory 106 and stores the compressed data in a storage unit 110. The storage unit 110 preferably comprises a memory such as a semiconductor memory which has a high read/write speed. The data compression unit 109 compresses the image data and flag data by different data compression methods. To the image data, the data compression unit 109 applies lossy compression such as JPEG (Joint Photographic Experts Group) but high-efficiency compression that can obscure image deterioration in consideration of the human visual characteristics. On the other hand, to the flag data, the data compression unit 109 uses lossless compression such as JBIG (Joint Binary Image Group) so as to prevent attribute flag information from being omitted or changed.

In this manner, the storage unit 110 stores the image data and flag data, which are compressed by the different compression methods, for each page (or band) of the original image. Note that all or some of the data stored in the storage unit 110 are often read out to an auxiliary storage unit 111. The auxiliary storage unit 111 preferably comprises a storage medium like a hard disk which has a slightly low read/write speed but has a large capacity. Using the auxiliary storage unit 111, a large number of pages of original images can be efficiently stored and accumulated.

When an image stored in the storage unit 110 or auxiliary storage unit 111 is to be printed by a printer 117, the image data and flag data are read out from the storage unit 110 or auxiliary storage unit 111. The image data and flag data are decompressed by a data decompression unit 112, and the decompressed image data and flag data are respectively stored in an image memory 114 and flag memory 115. At this time, a pixel density conversion unit 113 often converts the pixel density of the image data. For example, the pixel density is converted when an image stored in the storage unit 110 is to be printed or when stored images for a plurality of pages are to be combined and printed on a single print sheet.

Figure 7:
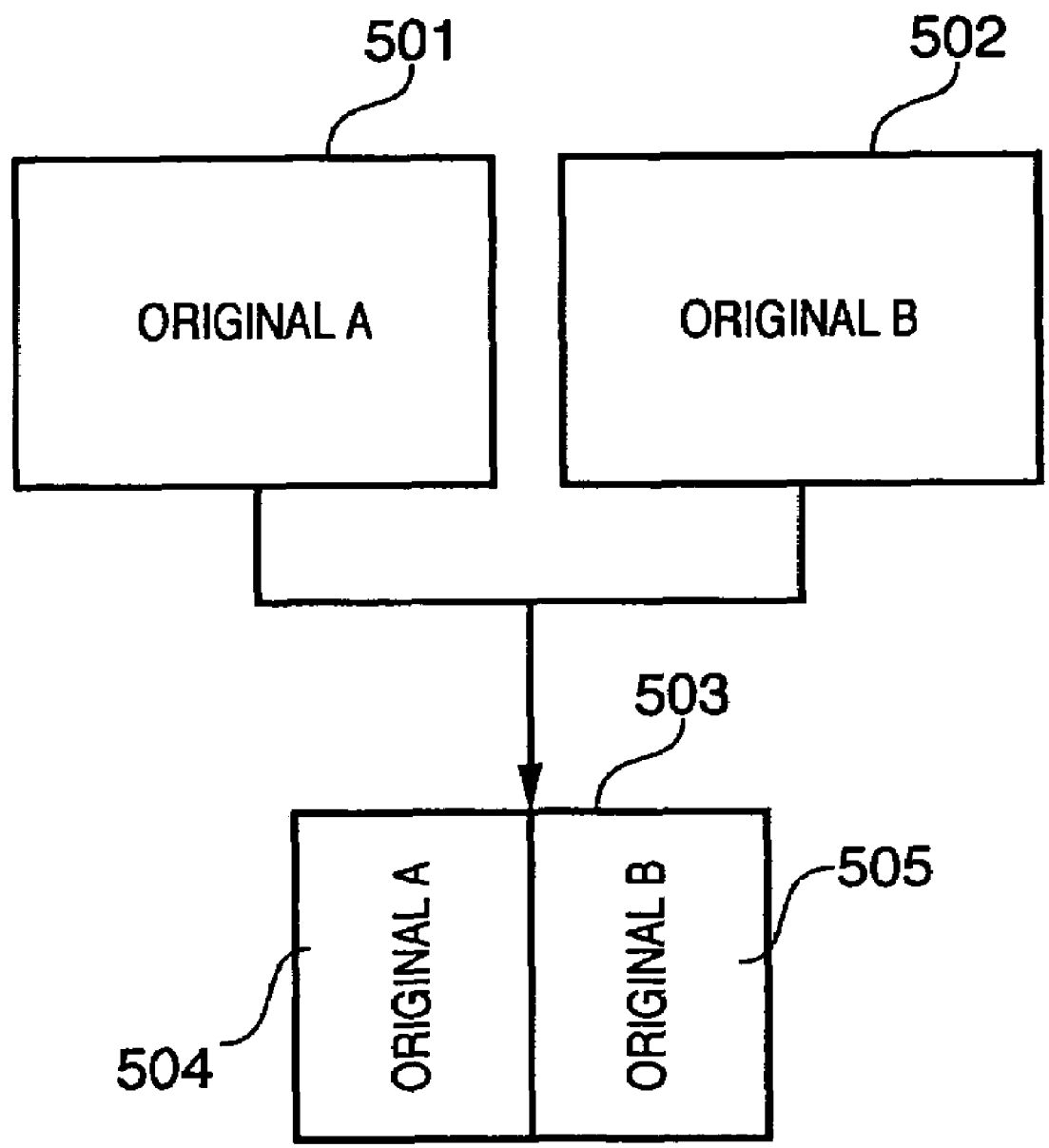
FIG. 7 shows a state wherein images for a plurality of pages are combined and printed.

FIG. 7 shows a state in which images for a plurality of pages are to be combined and printed. Two images 501 and 502 are stored in the storage unit 110, and are combined and printed on a print sheet 503 having the same size as an original. For this purpose, image data of the image 501 is read out and decompressed, and is reduced to a predetermined scale by the pixel density conversion unit 113. Furthermore, the image data is rotated counterclockwise through 900 by a rotation processor (not shown), and is written in a predetermined area (an area 504 in FIG. 7) of the image memory 114. Next, image data of the image 502 is read out from the storage unit 110, and is written in a predetermined area (an area 505 in FIG. 7) of the image memory 114 after decompression, resolution conversion, and rotation processes.

In this case, flag data corresponding to the images 501 and 502 are also written in corresponding areas of the flag memory 115 after decompression, resolution conversion, and rotation processes.

Note that the image data and flag data preferably undergo resolution conversion based on different methods. For example, a known method such as linear interpolation, interpolation by bicubic splines, or the like is applied to the image data. Also, a resolution conversion method suited to binary data such as a nearest-neighbor algorithm or the like is desirably used for the flag data.

An output image processor 116 receives image data and flag data when the image data and flag data stored in the image memory 114 and flag memory 115 reach predetermined stored data sizes. The output image processor 116 performs known image processing required to convert RGB image data input from the image memory 114 into a print image signal, i.e., RGB to CMYK conversion, gamma correction, binarization processing, and the like, and outputs processed CMYK image signals.

The printer 117 forms and outputs a visible image on a print sheet by driving a laser beam or ink-jet head based on the CMYK image signals output from the output image processor 116. Note that the flag data stored in the flag memory 115 are used to switch the processing contents of the output image processor 116.

Processing of Received Image

A communication interface (I/F) 118 receives a print job from an external communication path 119 such as a local area network (LAN) or the like. Representative image data to be appended to the print job includes page description language data which describes an image to be rendered for each page, and language data which describes an image for each band. Such data will be referred to as PDL data hereinafter.

An interpreter 108 converts the PDL data received by the communication I/F 118 into an intermediate language format called a display list.

A raster image processor (RIP) 107 performs rendering based on the display list to form bitmap data on the image memory 105. Also, the RIP 107 stores flag data indicating the attributes of the rendered bitmap data in the flag memory 106. The RIP 107 generates flag data for respective pixels of the rendered bitmap data with reference to attribute information information used to identify the attributes of components such as photo, text, graphics, and the like) held in the PDL data for respective print units (components). That is, upon reception of PDL data indicating generation of a text component, the RIP 107 generates text bitmap data, and stores MOJI='1' in the flag memory 106 as flag data of a region (text region) corresponding to a text image. Note that the RIP 107 stores MOJI='0' in the flag memory 106 for regions other than the text region.

The subsequent processing is the same as that for the scanned image, and a description thereof will be omitted.

[Region separation Processor]

The concept and example of region separation processing will be described below. Note that an example of a region attribute extraction method will be described below, but the region separation processing is not limited to the following method.

The region separation processing extracts features of an image and generates signals (flag data) indicating region attributes so as to apply optimal image processing suited to the features of the image. An original image includes various image regions such as a full-color photo region with continuous tone, a black text region, a halftone dot region represented by printing on a newspaper or the like, and so forth together. When identical image processing is uniformly applied to these regions with different features, preferred image quality cannot often be obtained as the processing result.

Hence, the attributes of image data included in an original image are detected using a color image signal output from the input image processor 102 to generate flag data used to identify these attributes.

Figure 2:
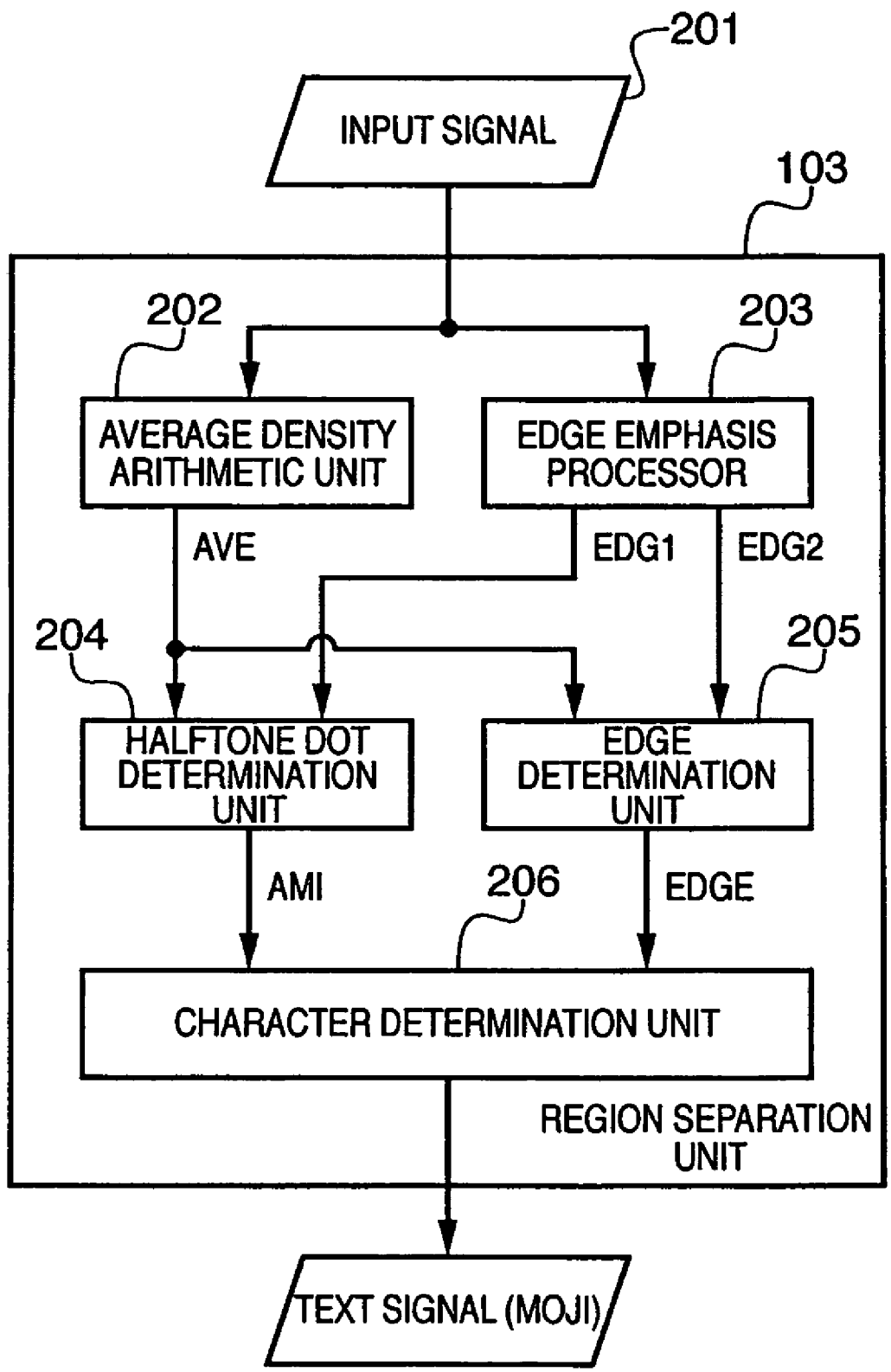
FIG. 2 is a block diagram showing the arrangement for detecting pixels of a text attribute of a region separation unit.

FIG. 2 is a block diagram showing the arrangement for detecting pixels with a text attribute of the region separation unit 103.

Input signals (color image signals) 201 are input to an average density arithmetic unit 202 and edge emphasis processor 203. The average density arithmetic unit 202 outputs an average value AVE of an area of M×N pixels (M and N are natural numbers) including an target pixel as the center. On the other hand, the edge emphasis processor 203 applies edge emphasis processing to the target pixel with reference to a surrounding area (e.g., an M×N pixel area) of the target pixel to output two edge emphasis signals EDG1 and EDG2 having different magnitudes. These signals are input to a halftone dot determination unit 204 and edge determination unit 205.

Figure 3:
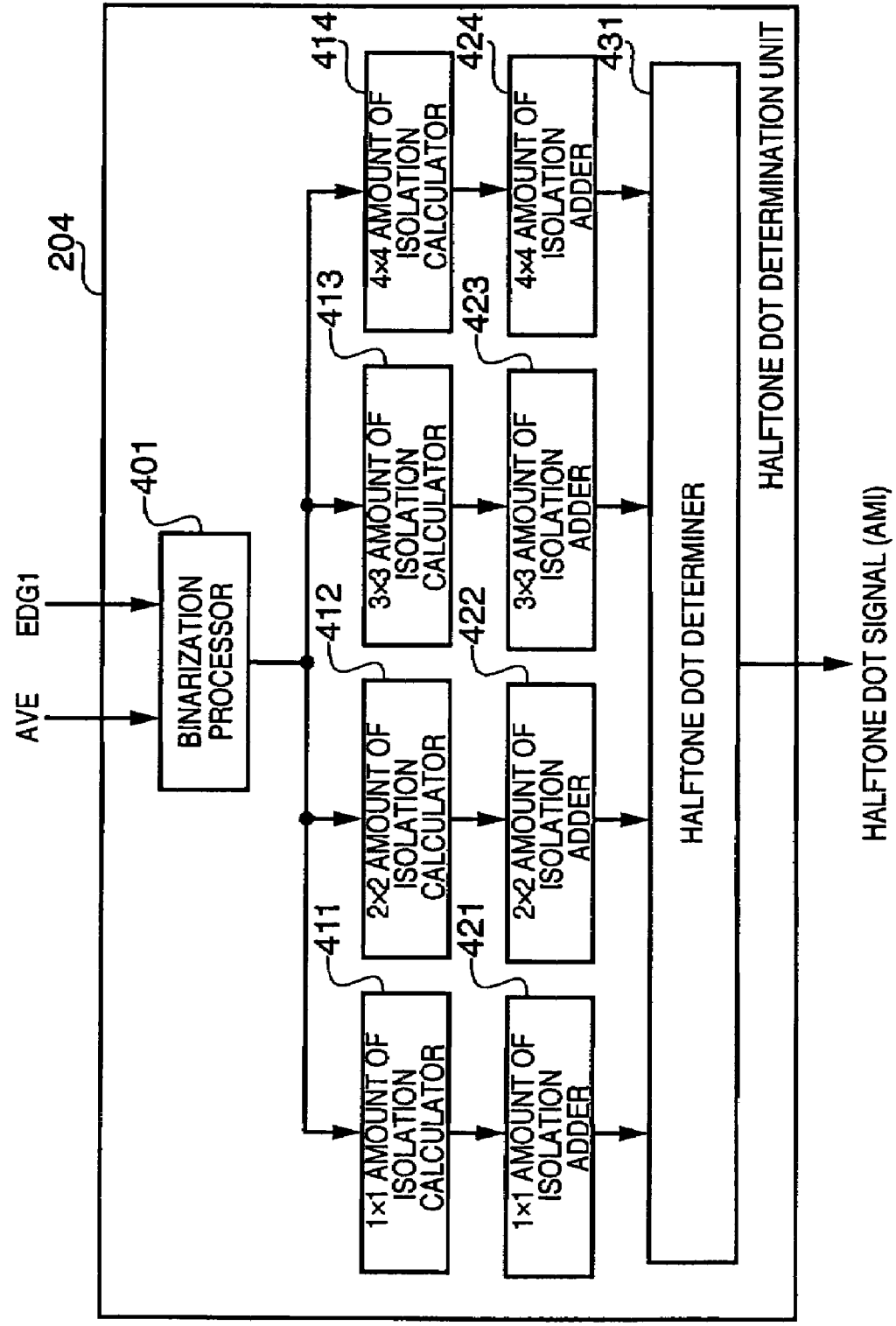
FIG. 3 is a block diagram showing the arrangement of a halftone dot determination unit which receives an average value AVE and edge emphasis signal EDG1.

FIG. 3 is a block diagram showing the arrangement of the halftone dot determination unit 204 which receives the average value AVE and edge emphasis signal EDG1.

A binarization processor 401 generates a binary signal based on a comparison result between the average value AVE and the product obtained by multiplying the edge emphasis signal EDG1 by a given coefficient A (real number) as follows:

If $A \times EDG1 < AVE$, binary signal='1'

If $A \times EDG1 \geq AVE$, binary signal='0' (1)

Binary signals obtained for respective pixels by the binarization processor 401 are input to a 1×1 amount of isolation calculator 411, 2×2 amount of isolation calculator 412, 3×3 amount of isolation calculator 413, and 4×4 amount of isolation calculator 414. The amount of isolation calculators 411 to 414 determine the degree of isolation of the target pixel using the binarization processing result.

For example, the 1×1 amount of isolation calculator 411 calculates an amount of isolation with reference to binary signals of a 3×3 pixel area having the target pixel as the central position. When the values of the binary signals change like '0', '1', and '0' in the vertical, horizontal, or oblique direction, the calculator 411 sets the amount of isolation in that direction to '1', and outputs a total of the amount of isolations in four directions, i.e., vertical and horizontal directions (one each direction) and oblique directions (two directions) as the amount of isolation of the target pixel. Therefore, a pixel with a high degree of isolation has an amount of isolation="4", and a pixel which is not isolated has an amount of isolation="0".

Note that the amount of isolation has a feature in that it becomes relatively large for a case in which a halftone dot is formed by one pixel, i.e., for a halftone dot pixel in a low-density area or a halftone dot with a high LPI (lines per inch).

Likewise, the 2×2 amount of isolation calculator 412, 3×3 amount of isolation calculator 413, and 4×4 amount of isolation calculator 414 output amount of isolations of the target pixel by comparing with predetermined binary pixel patterns.

A 1×1 amount of isolation adder 421 adds the amount of isolations calculated by the 1×1 amount of isolation calculator 411 for a predetermined area (e.g., a 9×9 pixel area). A 2×2 amount of isolation adder 422 adds the amount of isolations calculated by the 2×2 amount of isolation calculator 412 for a predetermined area. A 3×3 amount of isolation adder 423 adds the amount of isolations calculated by the 3×3 amount of isolation calculator 413 for a predetermined area. A 4×4 amount of isolation adder 424 adds the amount of isolations calculated by the 4×4 amount of isolation calculator 414 for a predetermined area.

A halftone dot determiner 431 performs threshold processing of each of the sum values calculated by the 1×1 amount of isolation adder 421, 2×2 amount of isolation adder 422, 3×3 amount of isolation adder 423, and 4×4 amount of isolation adder 424. The halftone dot determiner 431 outputs a halftone dot signal AMI via processes such as majority decision, logical operations, and the like based on the results of the threshold processing. Note that the halftone dot determiner 431 outputs a halftone dot signal AMI='1' when it determines that the target pixel forms a halftone dot region.

Figure 4:
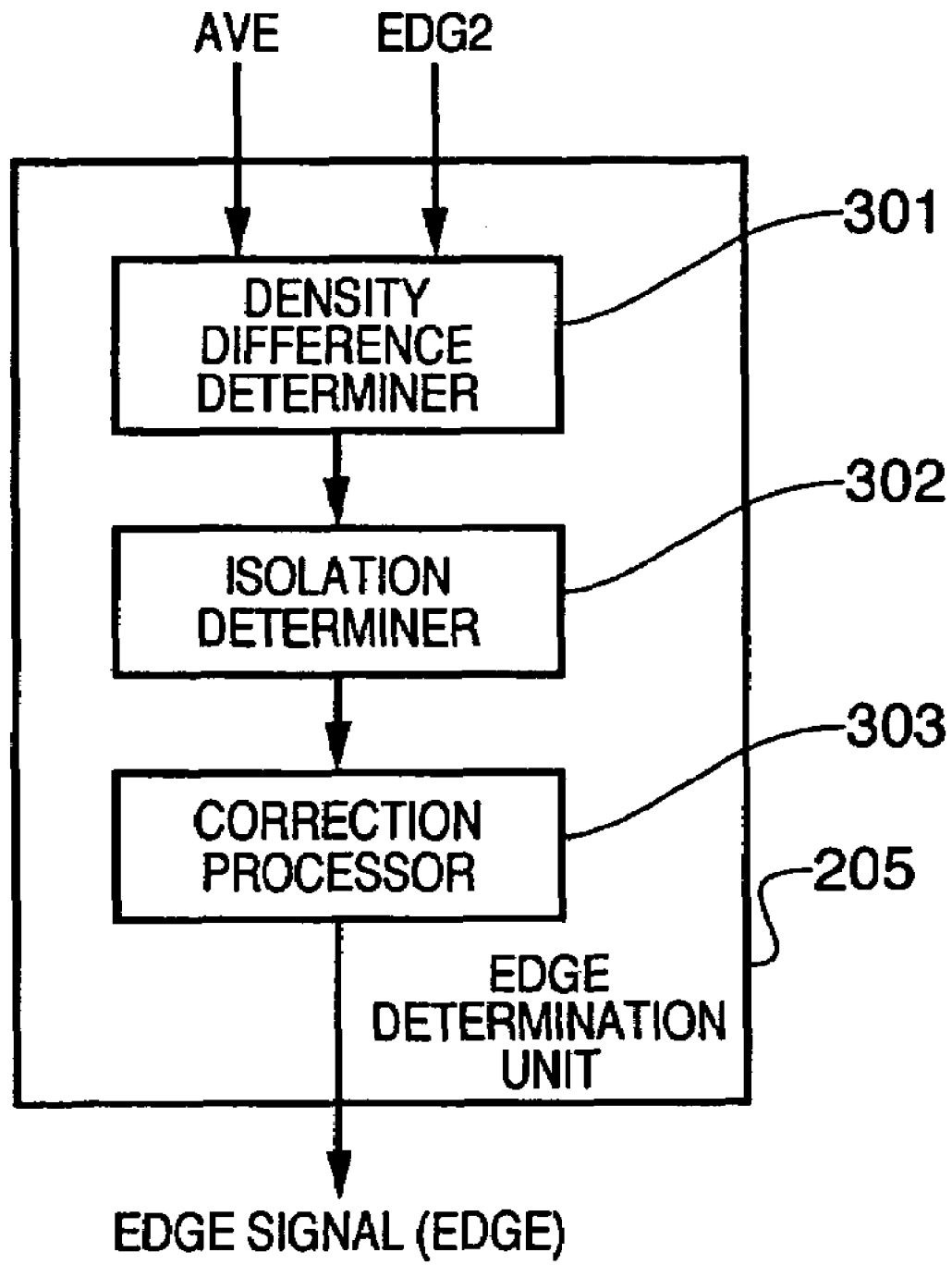
FIG. 4 is a block diagram showing the arrangement of an edge determination unit which receives the average value AVE and an edge emphasis signal EDG2.

FIG. 4 is a block diagram showing an example of the arrangement of the edge determination unit 205 which receives the average value AVE and edge emphasis signal EDG2.

A density difference determiner 301 generates a density difference signal based on a comparison result between a product obtained by multiplying the edge emphasis signal EDG2 by a given coefficient B (real number) and the average value AVE as follows.

If $C < AVE - B \times EDG2 < D$, density difference signal='1'

Otherwise, density difference signal='0' (2)

where C and D are real numbers or integers.

That is, the density difference determiner 301 outputs a density difference-signal according to the difference between the value of the edge emphasis signal EDG2 and the values of its surrounding area (average value AVE).

An isolation determiner 302 receives the density difference signal and removes an isolated point. For example, when there are no density difference signals with a value '1' at outermost pixel positions with reference to the density difference signals in a 7×7 pixel area, the isolation determiner 302 forcibly sets the values of the density difference signals in an inner 5×5 pixel area to '0', thus removing an isolated point. Note that the density difference signal after isolated point removal output from the isolation determiner 302 is called an "isolation determination signal".

A correction processor 303 receives isolation determination signals, and outputs an edge signal EDGE obtained by correcting a discontinuous part of the isolation determination signals. For example, when the values of isolation determination signals of eight pixels including the target pixel at the center of an area are '1' and the value of the isolation determination signal of the target pixel is '0' with reference to the isolation determination signals in a 3×3 pixel area, the processor 303 corrects the value of the isolation determination signal of the target pixel to '1'. With this processing, the processor 303 makes up a missing part where the isolation determination signals are lacking in an edge area of a line image or character, and generates smooth edge signals EDGE with increased continuity of the edge area of the line image or character. Note that the correction processor 303 outputs an edge signal EDGE='1' for an edge area.

A character determination unit 206 shown in FIG. 2 receives the halftone dot signal AMI output from the halftone dot determination unit 204 and the edge signal EDGE output from the edge determination unit 205, and outputs a text signal MOJI indicating a pixel with AMI='0' and EDGE '1'.

Figure 5:
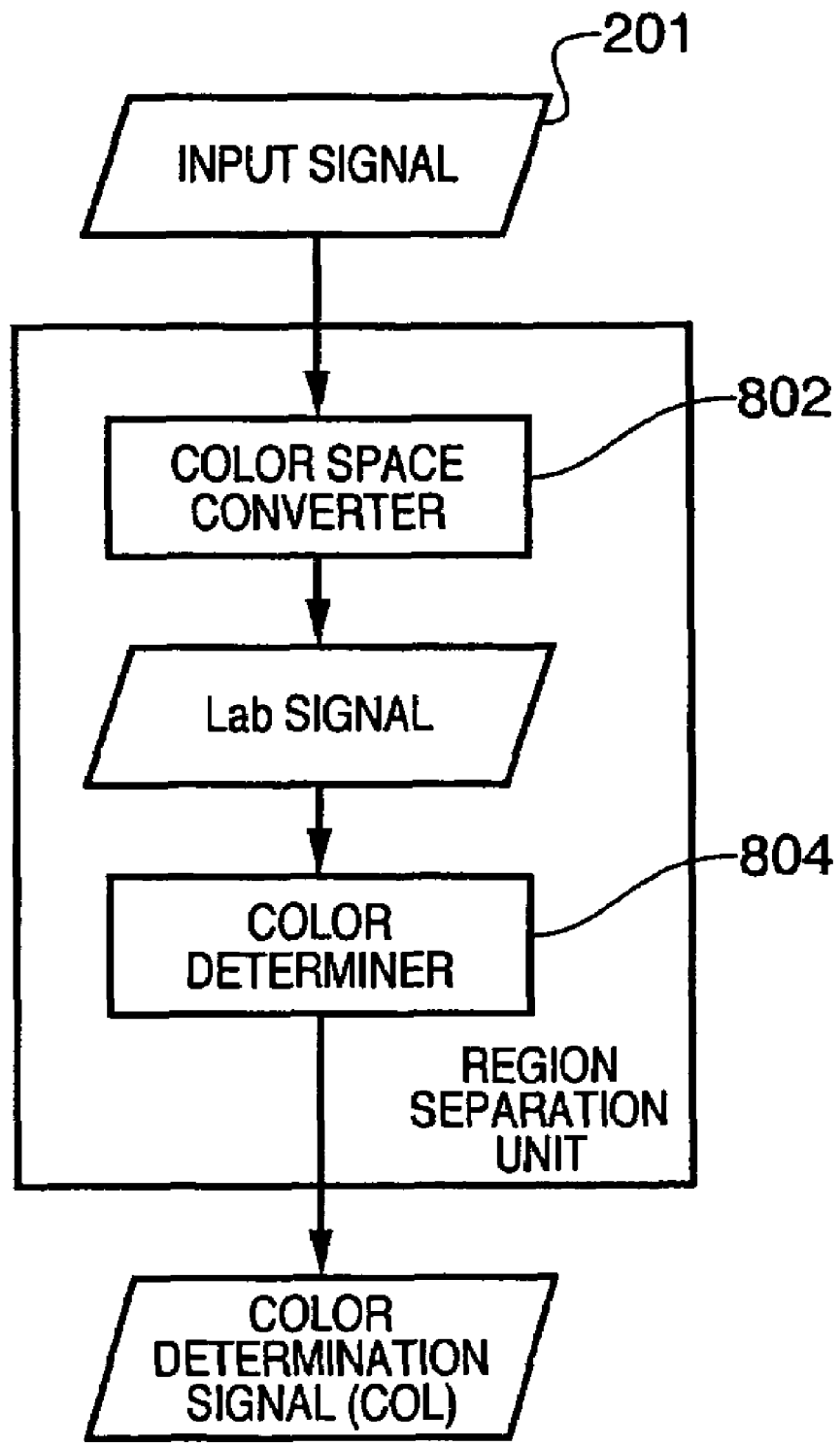
FIG. 5 is a block diagram showing the arrangement for detecting pixels of a color attribute of a region separation unit.

FIG. 5 is a block diagram showing the arrangement for detecting pixels with a color attribute of the region separation unit 103.

Input signals (color image signals) 201 are input to a color space conversion unit 802, and are converted into, e.g., Lab signals. A color determination unit 804 receives the Lab signals and outputs a color determination signal COL.

Whether or not a given pixel of image data is a color pixel can be easily determined by mapping the chromaticity levels of pixels. This determination processing will be described below taking an Lab color space as an example.

The Lab color space is the one which was proposed by CIE (Commission Internationale de l'Eclairage) in 1976 as a uniform color space. L represents lightness (brightness), a represents chromaticity from red to green, and b represents chromaticity from blue to yellow. Since the Lab color space is configured so that a change in three-dimensional color space is proportional to a change in color of visual sense influenced by that change, accurate color determination can be attained.

Equations (3) express an example of conversion from RGB signals into Lab signals. Normally, after XYZ tristimulus values are temporarily calculated from RGB signal values, Lab signal values are calculated from the XYZ tristimulus values. Note that the present invention is not limited to coefficients in equations (3) since they are device-dependent.

$$X=0.412391 \times R+0.357584 \times G+0.180481 \times B$$

$$Y=0.212639 \times R+0.715169 \times G+0.072192 \times B$$

$$Z=0.019331 \times R+0.119195 \times G+0.950532 \times B$$

$$L^*=116(Y/Y0)^{1/3}-16$$

$$a^*=500\{(X/X0)^{1/3}-(Y/Y0)^{1/3}\}$$

$$b^*=200\{(Y/Y0)^{1/3}-(Z/Z0)^{1/3}\} \quad (3)$$

where X0, Y0, and Z0 are tristimulus values of standard light.

Figure 6:
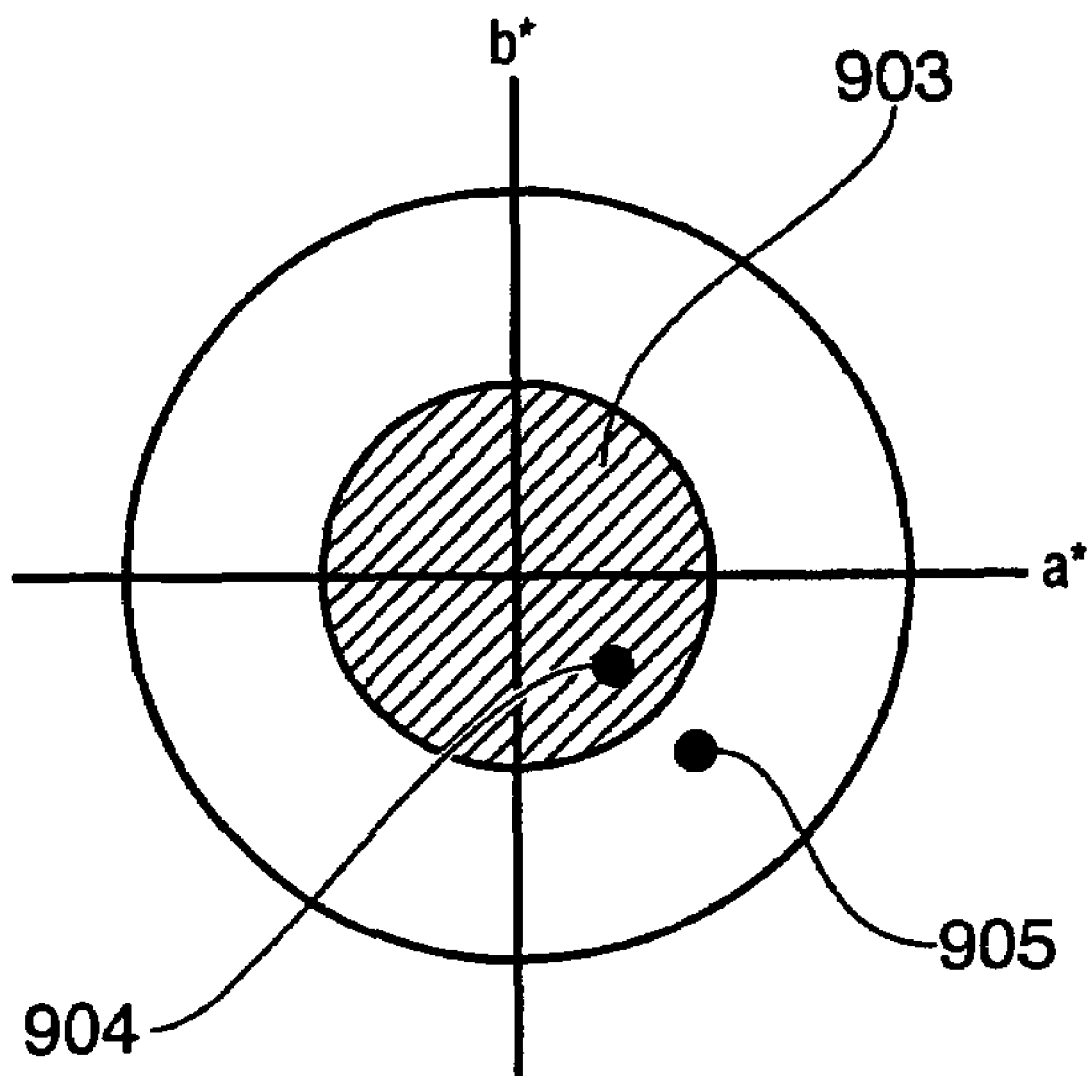
FIG. 6 is a view for explaining a method of determining whether or not a given pixel of image data is a color pixel.

By mapping ab values of respective pixels calculated using equations (3) on an orthogonal coordinate system, whether a given pixel is chromatic or achromatic color is determined. FIG. 6 shows an a*b* plane. Upon determining chromatic or achromatic color with reference to, e.g., saturation, the intersection between a* and b* axis, i.e., the origin is a point where the color component is zero, and saturation becomes higher with increasing distance from the origin (with increasing a* value and/or b* value). Therefore, chromatic or achromatic color can be determined by setting a threshold indicating the distance from the origin. That is, assuming that a hatched area 903 shown in FIG. 6 is an achromatic color area, if the ab values of a given pixel are located at a point 904 inside the hatched area 903, it is determined that the pixel is achromatic color. On the other hand, if the ab values are located at a point 905 outside the hatched area 903, it is determined that the pixel is chromatic color.

With the above method, whether the target pixel is chromatic or achromatic color, in other words, whether or not the target pixel is a pixel with a color attribute can be determined.

Note that the chromaticity calculation has been explained using Lab, but the present invention is not limited to this. In order to reduce the computation volume, simple conversion formulas may be used instead.

[Output Image Processor]

Figure 8:
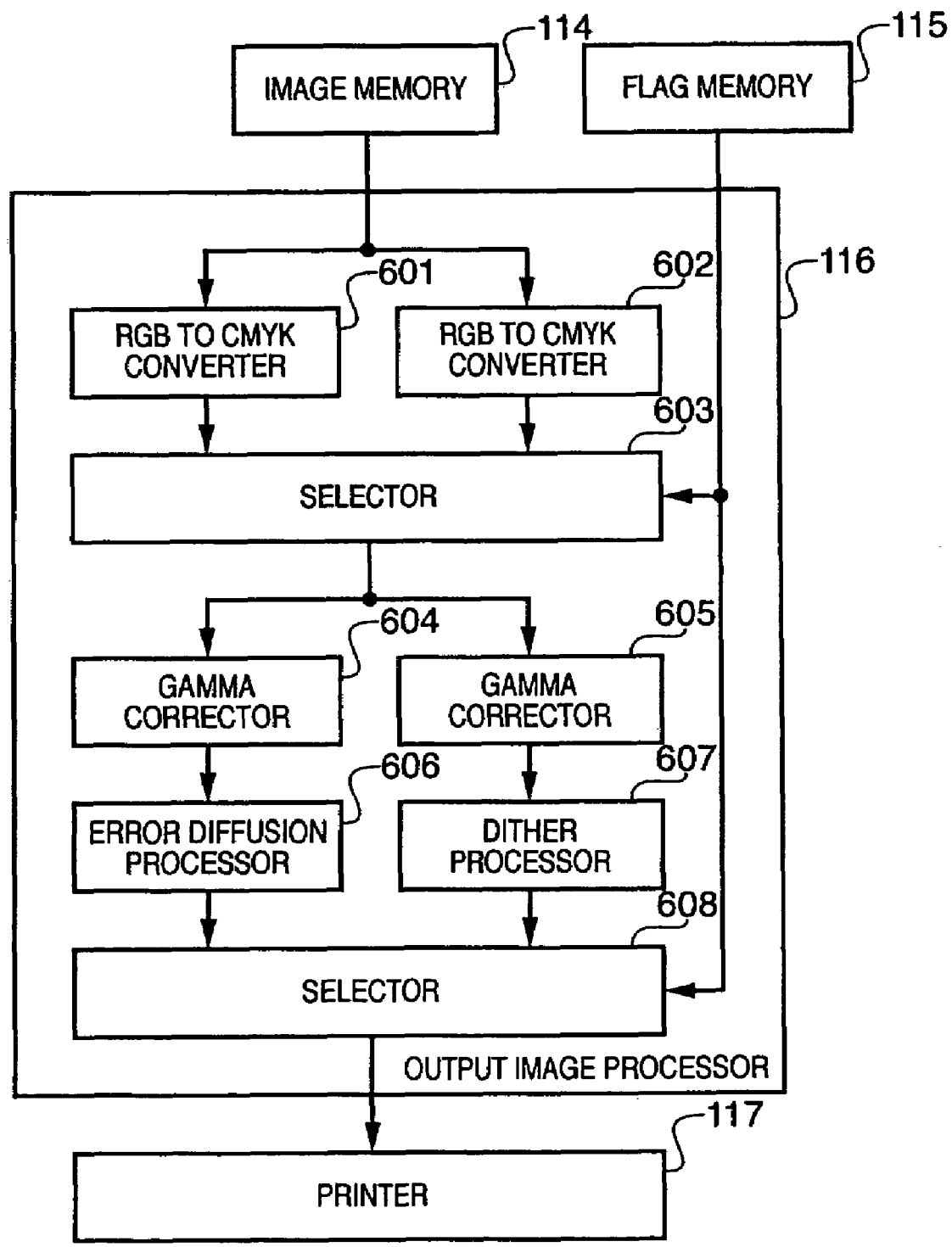
FIG. 8 is a block diagram showing the arrangement of an output image processor.

FIG. 8 is a block diagram showing the arrangement of the output image processor 116.

RGB to CMYK converters 601 and 602 receive RGB color image data from the image memory 114 and convert the received data into CMYK data. A selector 603 selects the output from the RGB to CMYK converter 601 or 602 for each pixel in accordance with the flag data input from the flag memory 115.

The RGB to CMYK converter 601 is set with conversion coefficients (or a conversion table) for a text region, and the RGB to CMYK converter 602 is set with conversion coefficients (or a conversion table) for regions other than a text region. Therefore, in case of a text region (MOJI='1') and non-color pixel (COL='0'), i.e., in case of a black character pixel, the selector selects CMYK image signals to which conversion coefficients that express the pixel by only black toner (or black ink) are applied. In other words, when image data is achromatic color, CMYK image signals to which coefficients (or a conversion table) for setting C, M, and Y=0 are applied is selected. On the other hand, in case of a region other than the text region (MOJI='0'), the selector 603 selects CMYK image signals to which conversion coefficients used to generate CMYK image signals which have C, M, and Y≠0 even for achromatic color (COL='1') and reproduce velvety black. In this way, the method of generating CMYK image signals can be changed between the text region and another region such as a photo region or the like, thus improving the image quality of an output image.

Next, the output from the selector 603 is input to a processing system including a gamma corrector 604 and error diffusion processor 606, and to a processing system including a gamma corrector 605 and dither processor 607. A selector 608 selects for respective pixels the output from the error diffusion processor 606 or that from the dither processor 607 in accordance with the flag data input from the flag memory 115.

Therefore, the selector 608 selects the output from the error diffusion processor 606 in preference to the sharpness of an output image for the text region and graph region, and selects that from the dither processor 607 with the emphasis on the tone characteristic for the photo region and halftone dot region, thus improving the image quality of the output image.

[Forgery Determination Processor]

A forgery determination processor 120 executes forgery determination processing required to prevent originals such as banknotes and the like whose copying is inhibited (to be referred to as "specific originals" hereinafter) from being copied. To attain this processing, there are some methods, and a representative one is pattern matching. Features such as the shape, colors, and the like of a specific original, or a feature intentionally embedded in an original image are extracted to calculate a similarity with information stored in advance, and whether or not the original of interest is a specific original is determined based on the similarity.

Figure 9:
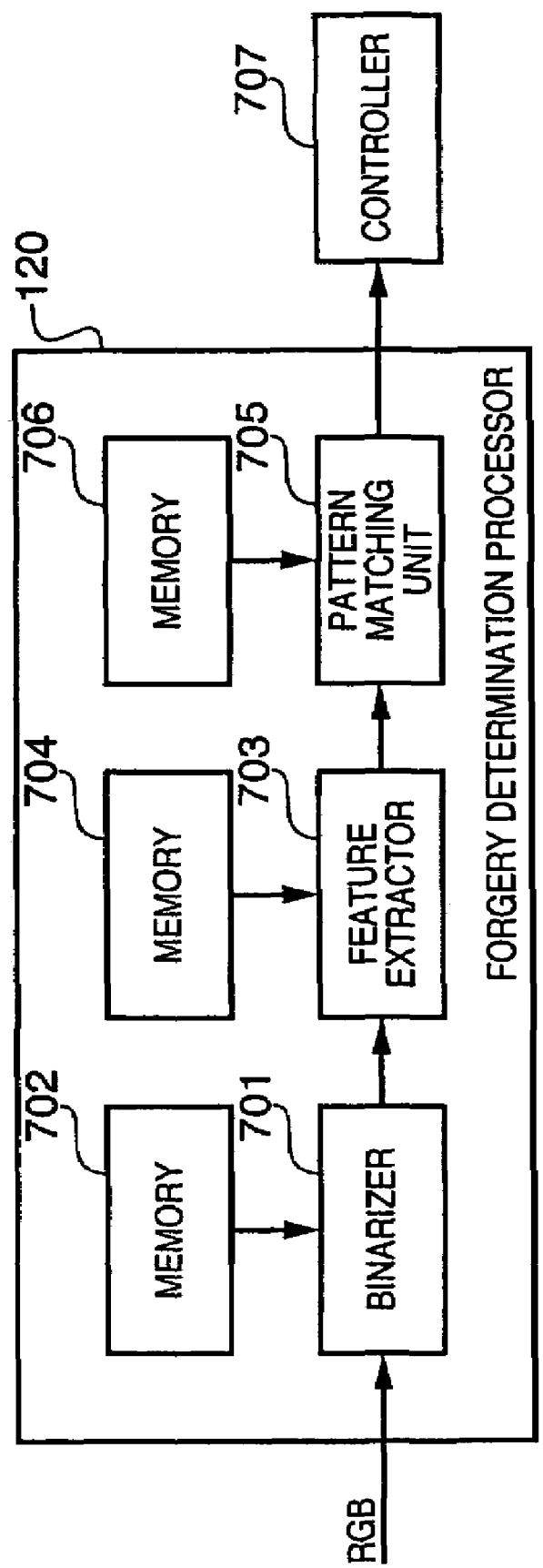
FIG. 9 is a block diagram showing the arrangement of a forgery determination processor.

FIG. 9 is a block diagram showing the arrangement of the forgery determination processor 120.

The forgery determination processor 120 receives a scanned image from the input image processor 102 or bitmap data from the RIP 107 as RGB image signals used in determination. A binarizer 701 binarizes input RGB image signals into a binary signal using a threshold stored in a memory 702. Note that the binarization threshold value is variable.

A feature extractor 703 extracts a portion similar to feature information stored in a memory 704 from the binary image. The memory 704 stores a shape, colors, or a specific mark which represent features of a specific original, a feature intentionally embedded in an original image, and so forth.

When an image extracted by the feature extractor 703 matches a pattern stored in a memory 706, a pattern matching unit 705 informs a controller 707 of that result. Upon reception of a message indicating that the pattern is matched, the controller 707 blocks copying or printing of the specific original by, e.g., deleting the scanned image or received image stored in the image memory 105 or painting the pattern-matched image portion in solid black.

Note that the controller 707 comprises a one-chip CPU or the like, which controls the aforementioned respective units to control the operation of the entire apparatus. An example of the forgery determination processing to be executed in a copying machine or the like has been explained. However, the present invention is not limited to such specific processing.

[Background Removal]

Figure 10:
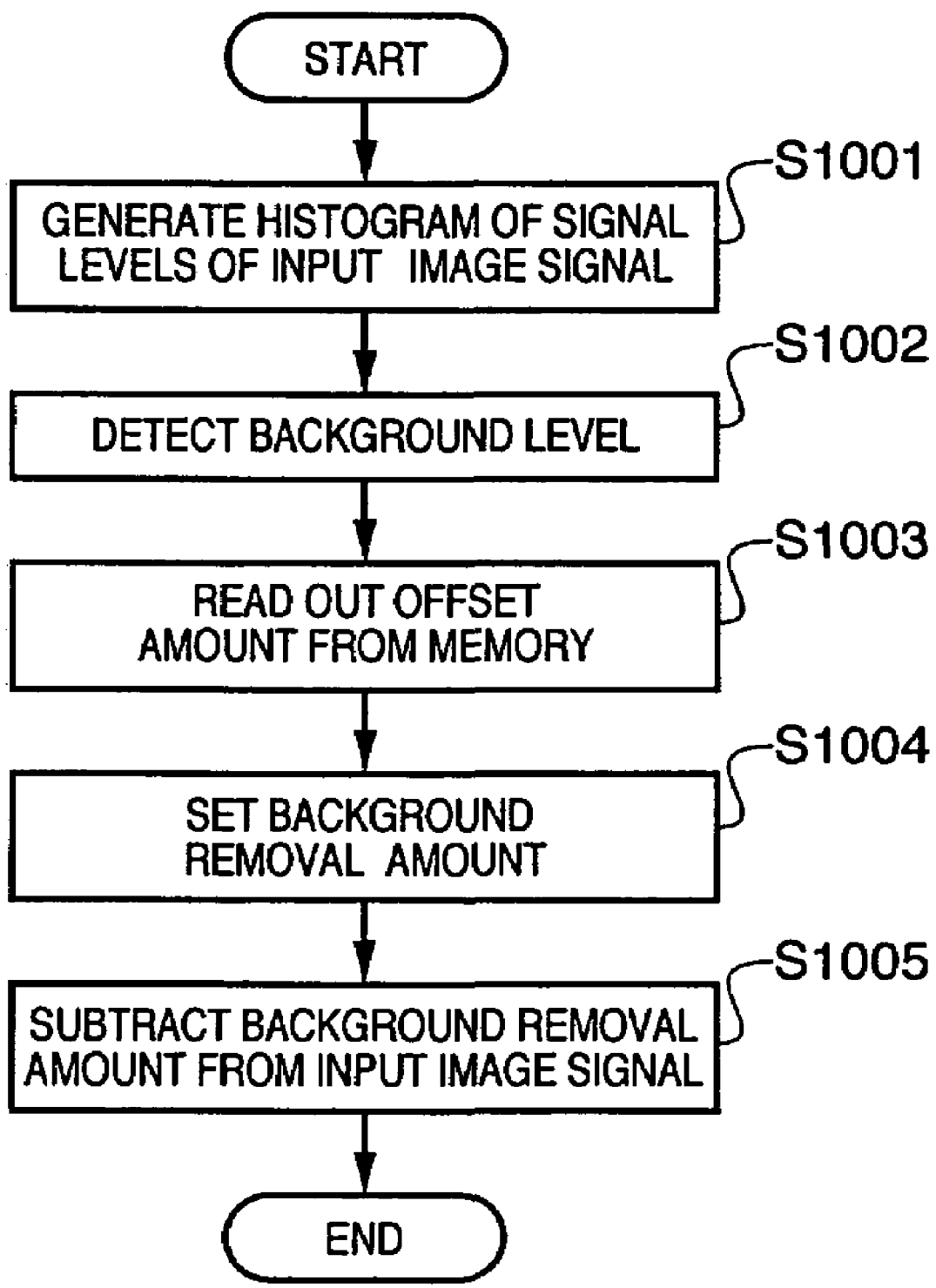
FIG. 10 is a flowchart when an input image processor is controlled to execute background removal.

FIG. 10 is a flowchart when, for example, the input image processor 104 is controlled to execute background removal.

A histogram of the signal levels of an input image signal is generated (S1001), and a background level is detected based on the generated histogram (S1002). An offset amount, which is adjusted and set in advance, is read out from a memory (S1003), and a background removal amount is determined by subtracting the offset amount from the detected background level (S1004). The determined background removal amount is subtracted from the input image signal, thus removing the background from the scanned image stored in the image memory 105 (S1005).

Figure 11:
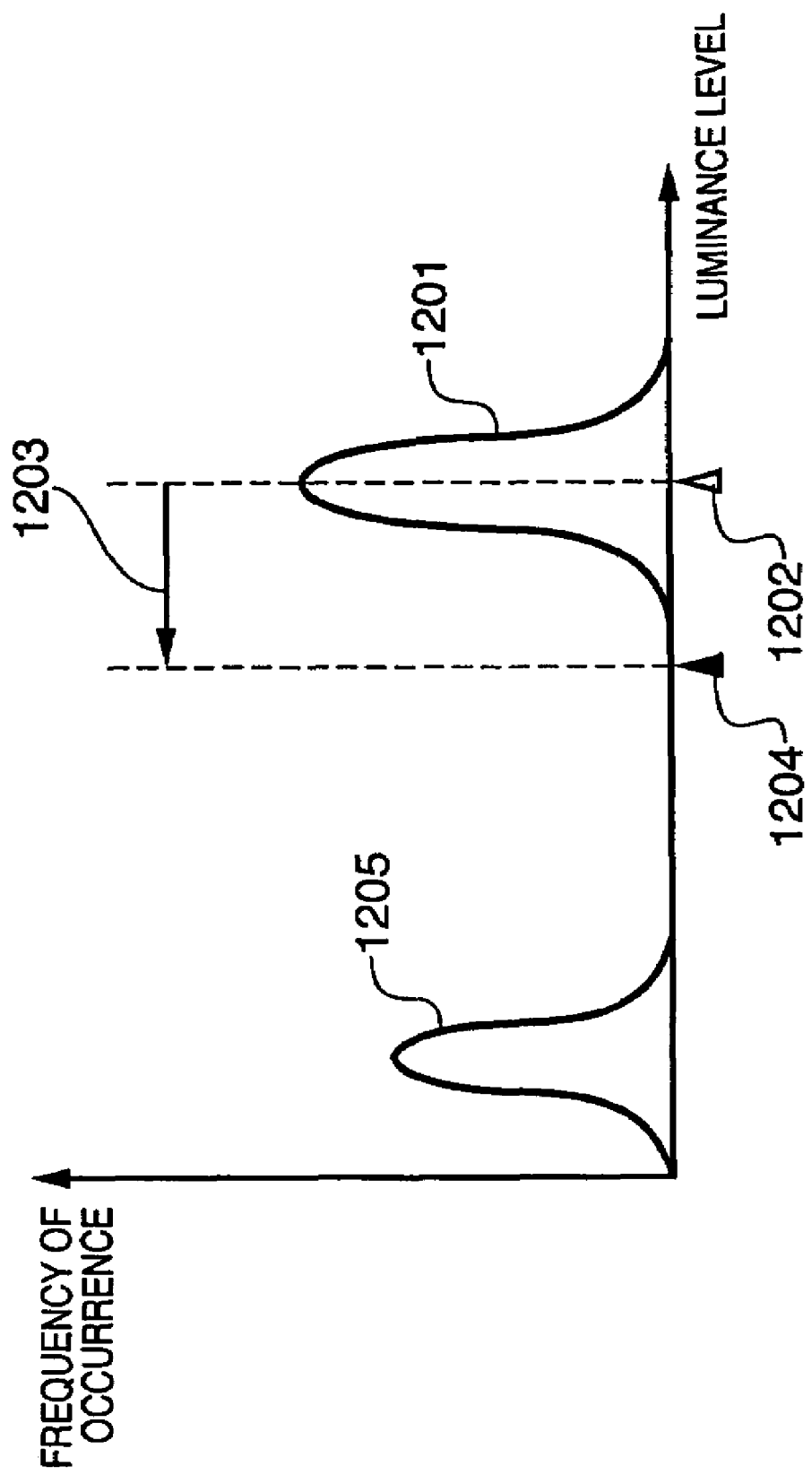
FIG. 11 shows an example of a histogram of an image signal obtained by scanning an original prepared by writing black characters on a common white sheet.

FIG. 11 shows an example of the histogram of an image signal obtained by scanning an original prepared by writing black characters on a general white sheet. In FIG. 11, the abscissa plots the luminance level, and the ordinate plots the frequencies of occurrence for respective luminance levels.

The histogram shown in FIG. 11 includes two peaks corresponding to a text part 1205 (black) and background part 1201 (white). The text part 1205 forms a distribution with a given variance in a low-luminance range. The background part 1201 forms a distribution with a given variable in a high-luminance range. When an offset amount 1203 is subtracted from a peak value (maximum frequency of occurrence) of this background part 1201 as a background level 1202, a background removal amount 1204 is obtained.

This histogram is generated based on not all (all pixels) of the input image signal but discrete sampling results of the input image signal, so as to reduce the use memory size and to improve the processing speed.

Figure 12:
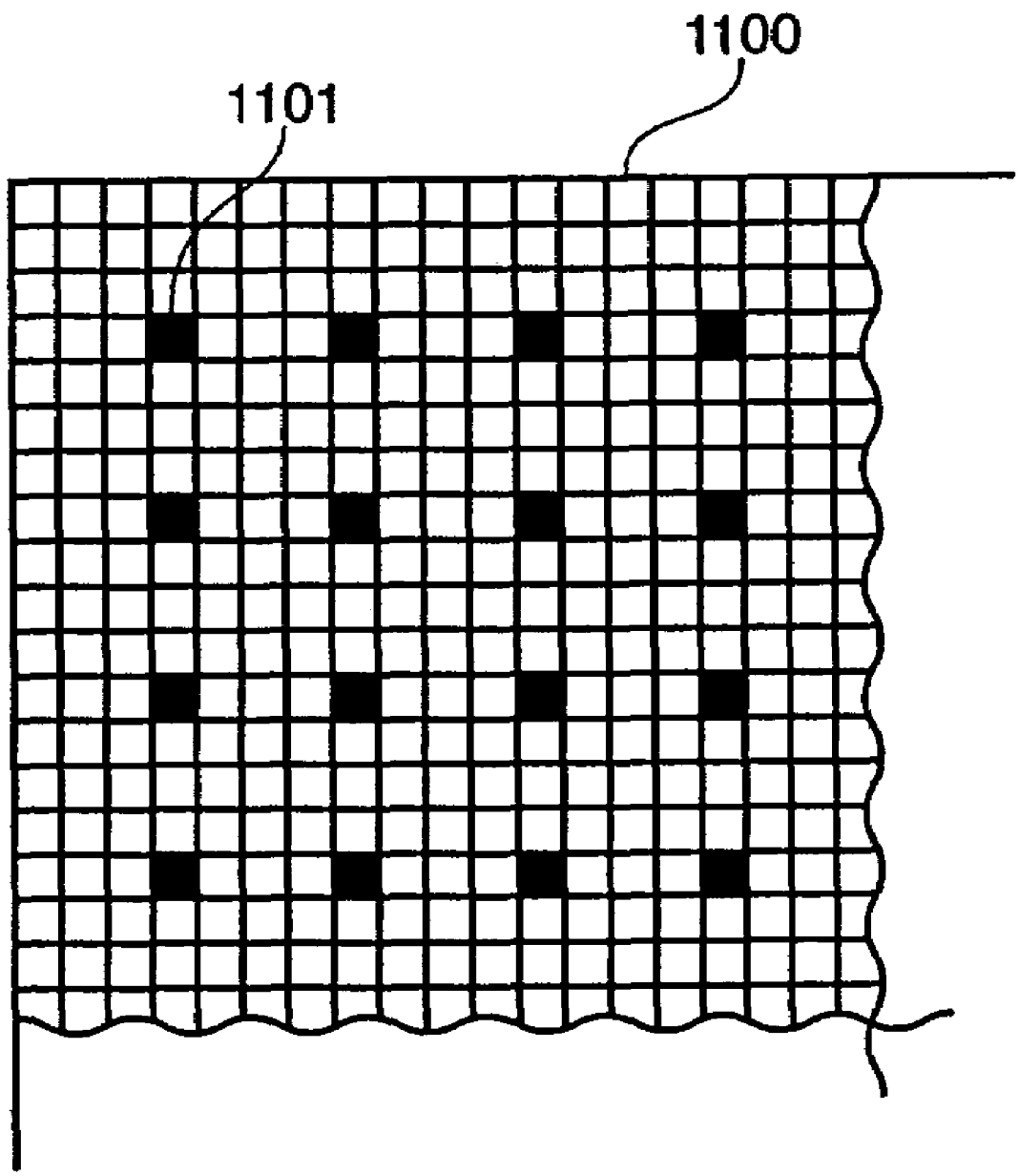
FIG. 12 partially shows image data of a scanned image.

FIG. 12 partially shows image data 1100 of a scanned image. Of a large number of pixels of the image data 1100, pixels 1101 are sampling pixels used to generate a histogram, and other pixels are not used to generate the histogram.

However, when a histogram is generated based on the sampling pixels, the background level cannot often be accurately detected under the influence of an image of dust attached to an original and the noise upon scanning. Of course, to avoid such problem, a histogram may be generated based on all the pixels, or the background levels may be detected for respective blocks, and the average value of these background levels may be calculated. However, these methods cannot be easily implemented, since a memory used to count the frequency of occurrence for each level requires a large memory size if it is configured to count all the number of pixels, and since a line memory is required to calculate the average value.

Hence, this embodiment implements background removal using a data storage unit 130 in place of the input image processor 104 without increasing the memory size.

Figure 13:
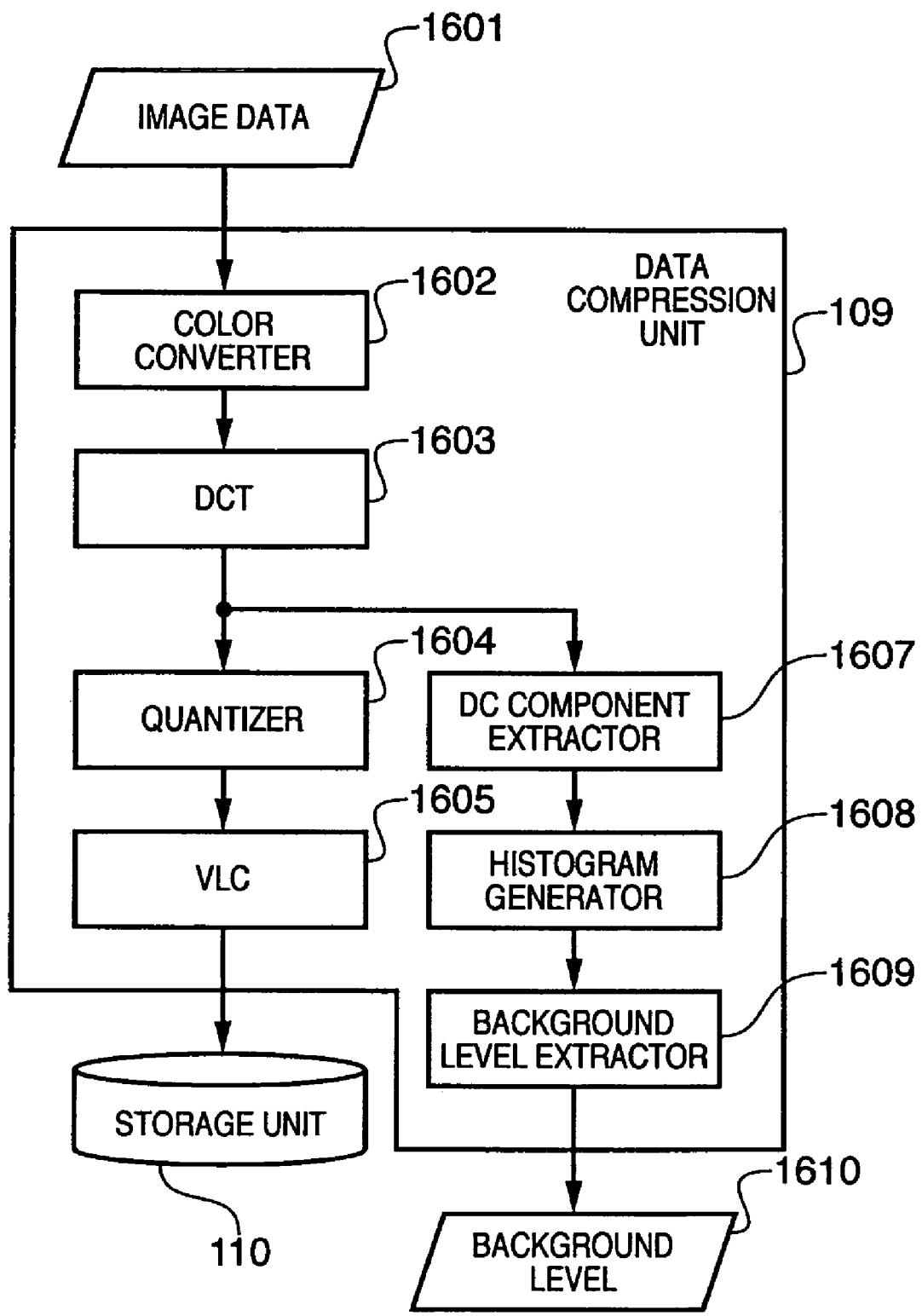
FIG. 13 is a block diagram showing the arrangement of a data compression unit.

FIG. 13 is a block diagram showing the arrangement of the data compression unit 109.

A color converter 1602 converts RGB image signals of, e.g., 256 tone levels input to the data compression unit 109 into luminance and color difference signals (YCbCr signals). Note that Lab signals may be used in place of YCbCr signals. A discrete cosine transformer (DCT) 1603 computes the discrete cosine transforms of luminance and color difference signals output from the color converter 1602 for respective pixel blocks (e.g., 8×8 pixels) to transform them into DCT coefficients (data of the frequency domain). In this embodiment, discrete cosine transformation (DCT) is used upon encoding image data. However, any other methods may be used as long as they are orthogonal transformation methods.

A quantizer 1604 quantizes the DCT coefficients for respective 8×8 pixel blocks, which are output from the DCT 1603, using a quantization matrix set in advance, to reduce a data size, and outputs quantized values of pixel blocks for runlength compression by zigzag-scanning them. A variable length encoder (VLC) 1605 Huffman-encodes the quantization values input in the zigzag scan order from the quantizer 1604 to further reduce the data size, and stores the encoded data in the storage unit 110.

On the other hand, a DC component extractor 1607 extracts DC components from the DCT coefficients (coefficients of orthogonal transformation) of the luminance signal output from the DCT 1603. A histogram generator 1608 generates a histogram by calculating the average luminance levels of image blocks based on the DC components extracted by the DC component extractor 1607. A background level extractor 1609 outputs the luminance value of a peak with a given frequency of occurrence in, e.g., the high-luminance range or that of the first peak viewed from the high-luminance side as a background level 1610 with reference to the histogram generated by the histogram generator 1608.

In view of the characteristic of DCT transformation, a DC component corresponds to the average value of signal values of each pixel block. Therefore, generating a histogram based on the DC components of luminance signals amounts to generating a histogram based on the average values of the luminance signal values of the pixel blocks of actual image data. In this way, the influences of noise and a dust image can be eliminated using the average values without increasing the memory.

The controller 707 subtracts the aforementioned offset value from the background level 1610 output from the background level extractor 1609 to determine a background removal amount. As the offset value, a value that considers the range of luminance values of the background part is set. As a result, the background can be completely removed.

Figure 14:
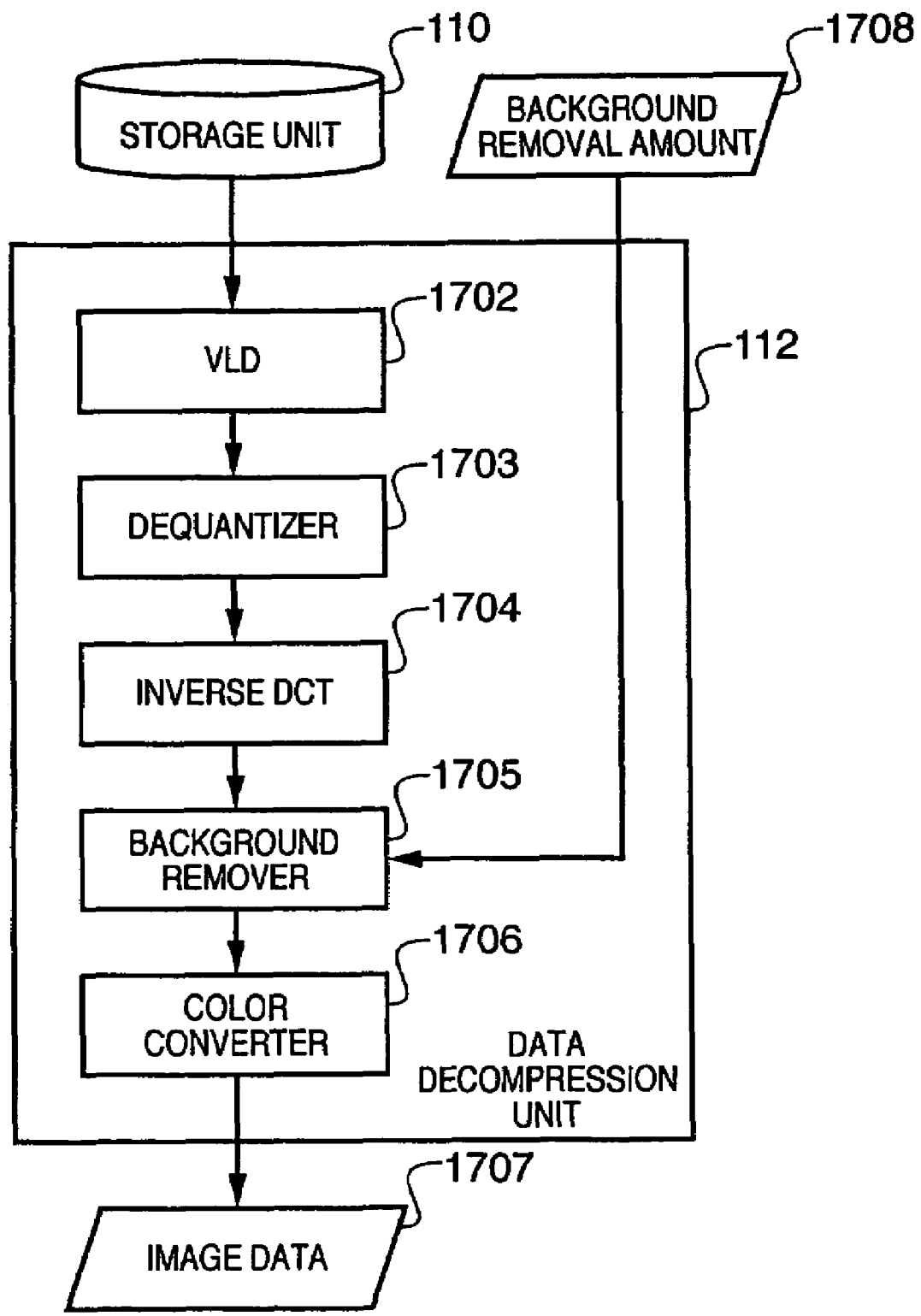
FIG. 14 is a block diagram showing the arrangement of a data decompression unit.

FIG. 14 is a block diagram showing the arrangement of the data decompression unit 112.

The data decompression unit 112 reads out encoded data from the storage unit 110. A variable length decoder (VLD) 1702 performs Huffman decoding. A dequantizer 1703 rearranges data output from the VLD 1702 into 8×8 pixels in correspondence with a zigzag scan, and dequantizes them using a dequantization matrix set in advance to decode DCT coefficients.

An inverse DCT 1704 computes the inverse DCTs of the DCT coefficients output from the dequantizer 1703 to reclaim luminance and color difference signals. A background remover 1705 subtracts a background removal amount 1708 input from the controller 707 from the luminance signal reclaimed by the inverse DCT 1704. A color converter 1706 converts the luminance and color difference signals output from the background remover 1705 into RGB image signals, and outputs image data 1707.

Figure 15:
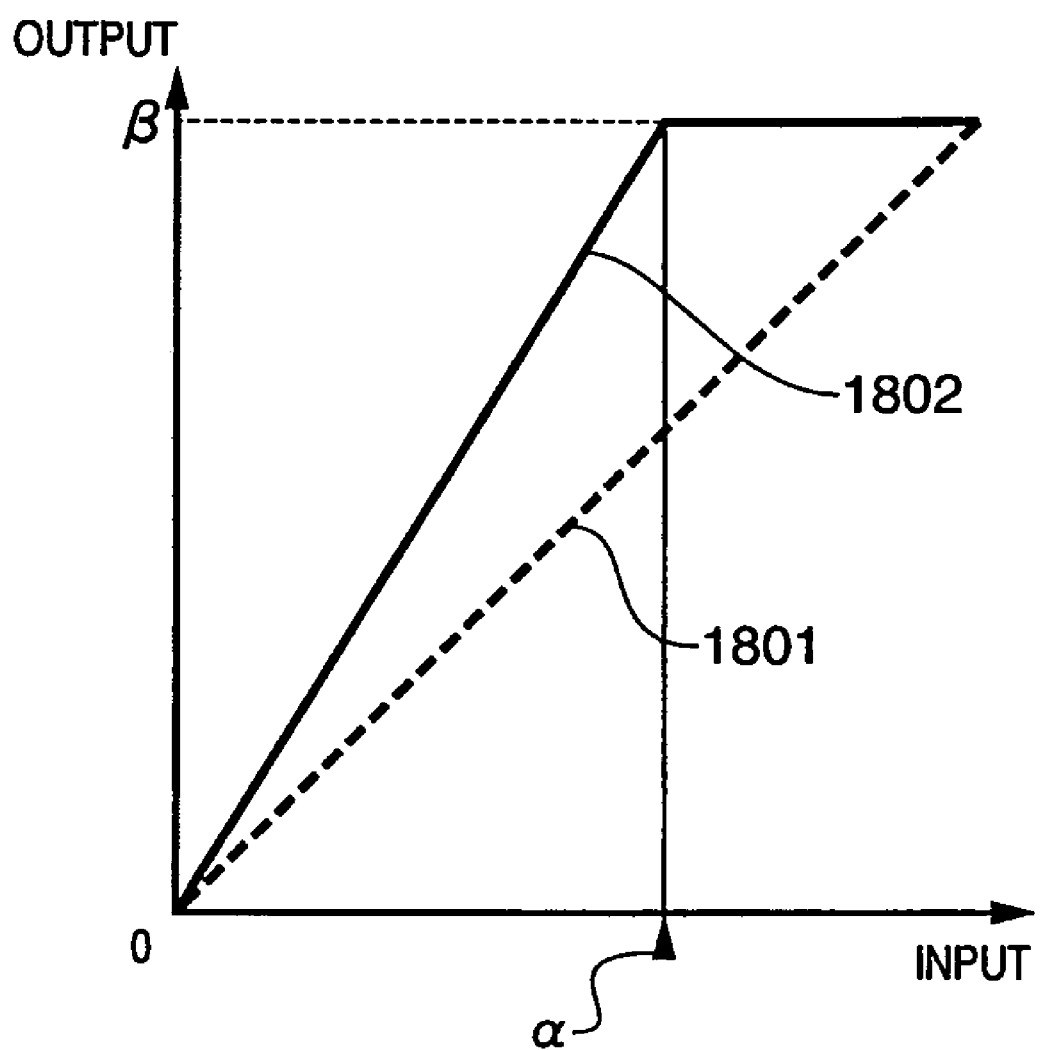
FIGS. 15 and 16 are views for explaining background removal according to the embodiment of the present invention.
Figure 16:
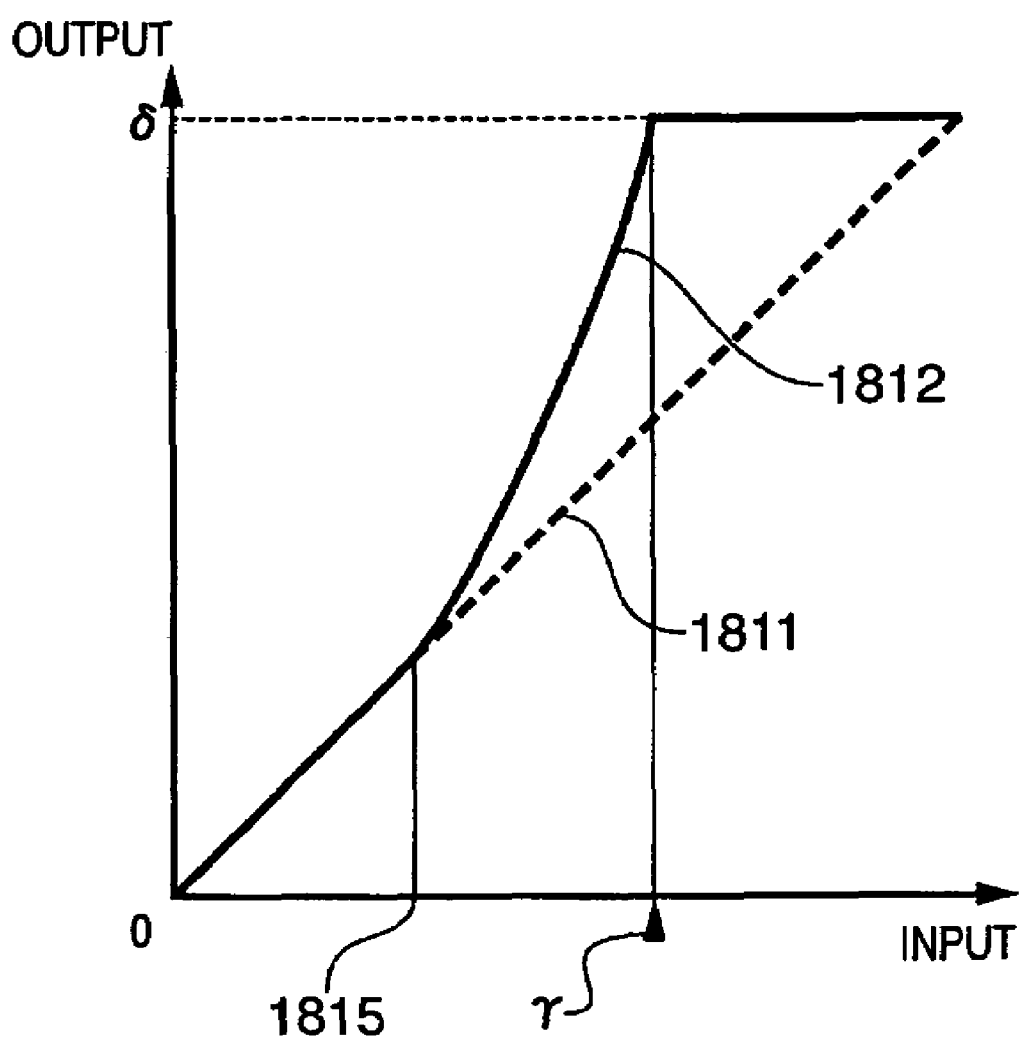

FIGS. 15 and 16 are views for explaining background removal according to this embodiment.

FIG. 15 shows a change in signal before and after background removal when the background removal amount has given level α. That is, when a signal of level a is input, the input signal is converted so that its output level assumes a maximum value β. An input signal lower than level α is linearly converted to have an output level which falls within the range between 0 to the maximum value β, as indicated by reference numeral 1802. The output level of an input signal higher than level α is saturated at the maximum value β. Note that the maximum value β is "255" in case of an 8-bit luminance signal.

FIG. 16 shows an example wherein the background is removed nonlinearly in place of linear background removal shown in FIG. 15. When the background removal amount is given level γ and a signal of level γ is input, the input signal is converted so that its output level assumes a maximum value δ. An input signal which is lower than level γ and is higher than a predetermined level 1815 is nonlinearly converted, as indicated by reference numeral 1812, and an input signal lower than the predetermined level 1815 is not converted. The output level of an input signal higher than level γ is saturated at the maximum value δ. When such nonlinear conversion is made, changes in signal in a dark part (low-luminance range) and halftone part (halftone range) can be suppressed, and a bright part (high-luminance range) can be set as an area which is to undergo background removal. Therefore, the background can be removed while suppressing a change in impression of the entire image, thus obtaining an image with natural impression.

In the above description, upon calculating the background removal amount, the adjusted offset amount is subtracted from the background level. However, the offset amount may be fixed. The method of calculating the background level based on the histogram is not limited to that in the above description. In the above description, a peak equal to or higher than a given frequency of occurrence or the first peak viewed from a maximum luminance is selected as a background level. However, a peak to be selected as the background level may be determined based on the relationship among a plurality of peaks in place of one peak. Alternatively, the background level may be determined based on the signal level of the bottom of the peak in place of its top or it may be determined based on both the top and bottom of the peak or the distribution shape.

In the above description, the DCT coefficients of the luminance signals are input to the DC component extractor 1607. Alternatively, the quantized values of the DCT coefficients may be input to the DC component extractor 1607. In this case, the quantized value of the DC components must be dequantized to actual image data.

Furthermore, in the example of the above description, a histogram is generated based on the luminance signals. Alternatively, histograms may be generated for the luminance signal Y and color difference signals Cb and Cr. For example a three-dimensional histogram may be generated based on three signals to set the background level of color information.

Thus, the color background of an image scanned from a pale print sheet can be removed. A histogram may be generated based on RGB signals in place of the luminance and color difference signals to detect the background level, thus attaining background removal. In this case, a uniform background removal amount may be subtracted from RGB image signals, or background removal amounts may be set for R, G, and B signals to attain background removal. Of course, it is desirable to set background levels for respective channels and to also independently set offset amounts.

In this way, a histogram indicating a signal distribution is generated using the DC components of DCT coefficients calculated upon compressing (encoding) image data, and a background level is detected using this histogram to perform background removal. In this way, background removal immune to any dust image and noise can be realized. Especially, since the DC components of the DCT coefficients allow to calculate the average value of signals of a plurality of pixels (e.g., 8×8 pixels) of each pixel block, the need for a memory or arithmetic operation used to calculate the average value of signals of a plurality of pixels to detect only the background level can be obviated. Since a histogram is generated using a plurality of pixels of each pixel block as one unit, the memory size of the memory used to count the frequencies of occurrence for respective signal levels can be equal to that required to generate a histogram using sampling pixels.

Second Embodiment

Image processing according to the second embodiment of the present invention will be described below. Note that the same reference numerals in the second embodiment denote the same parts as in the first embodiment, and a detailed description thereof will be omitted.

In the first embodiment, the method of eliminating the influences of any dust image and noise by generating a histogram based on DC components obtained as a result of computing the two-dimensional orthogonal transforms of an image signal, and detecting a background level from the shape of the histogram to perform background removal has been explained. In the second embodiment, processing for appropriately removing a background from clips of newspapers or magazines pasted on white sheets will be explained.

Figure 17:
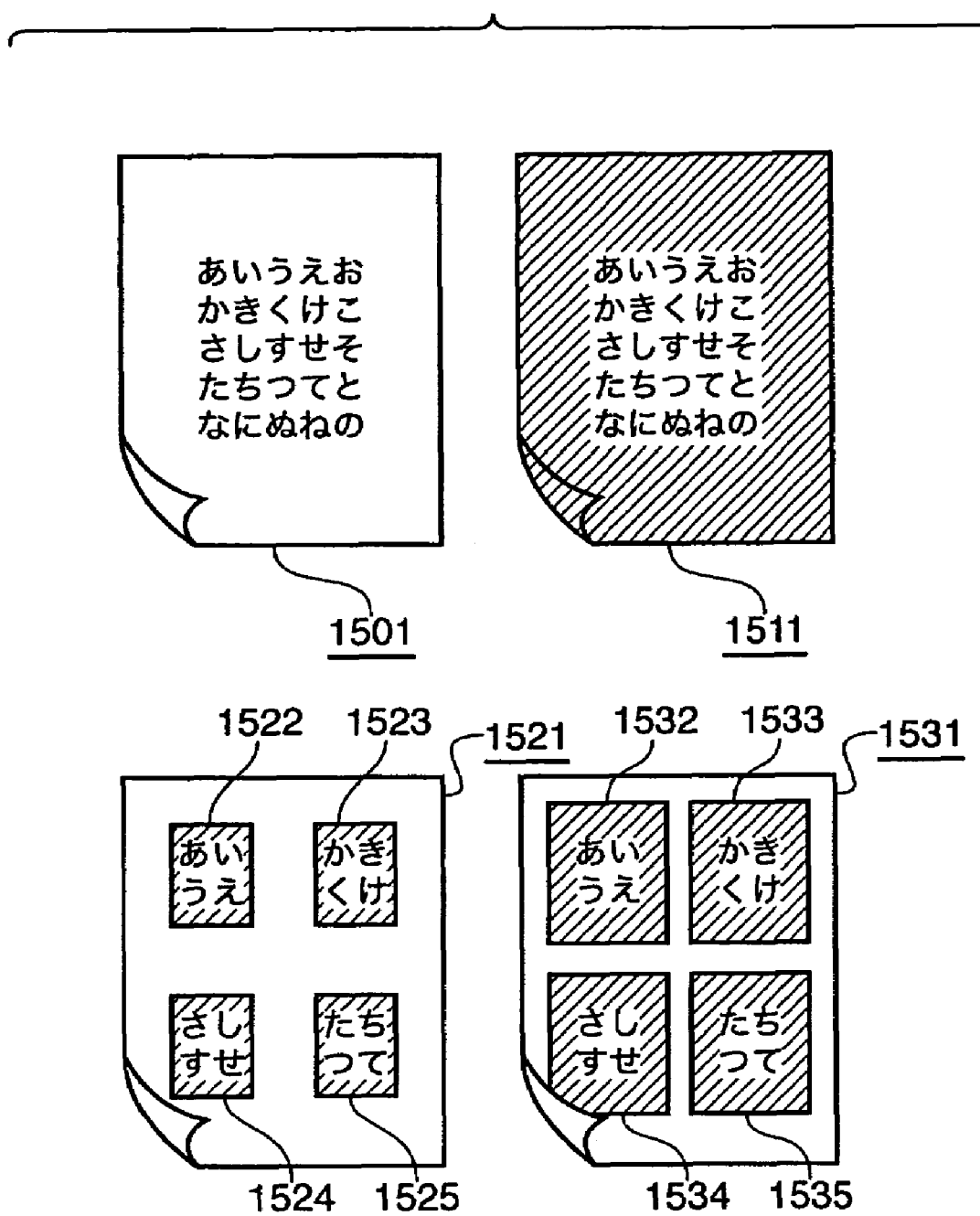
FIG. 17 shows examples of four different types of originals.

FIG. 17 shows an example of four different originals.

On an original 1501, black characters are printed on a paper sheet with a white background. On an original 1511, black characters are printed on a paper sheet like a newspaper (whose background is not white). On an original 1521, originals 1522 to 1525 clipped from the original 1511 are pasted on a paper sheet (board) equivalent to that of the original 1501. Also, on an original 1531, originals 1532 to 1535 clipped from the original 1511 are pasted on a paper sheet (board) equivalent to that of the original 1501. However, since the clipped originals 1532 to 1535 have a larger area than the clipped originals 1522 to 1525, the original 1531 has a smaller area of a white background portion than the original 1521.

A histogram of the original 1501 is as shown in, e.g., FIG. 11, and includes two peaks corresponding to a text part 1205 and background part 1201. The text part 1205 forms a distribution with a given variance in a low-luminance range. The background part 1201 forms a distribution with a given variable in a high-luminance range. When an offset amount 1203 is subtracted from a peak value (maximum frequency of occurrence) of this background part 1201 as a background level 1202, a background removal amount has a level indicated by reference numeral 1204. As a result, the background part 1201 is completely removed, thus attaining satisfactory background removal.

Figure 18:
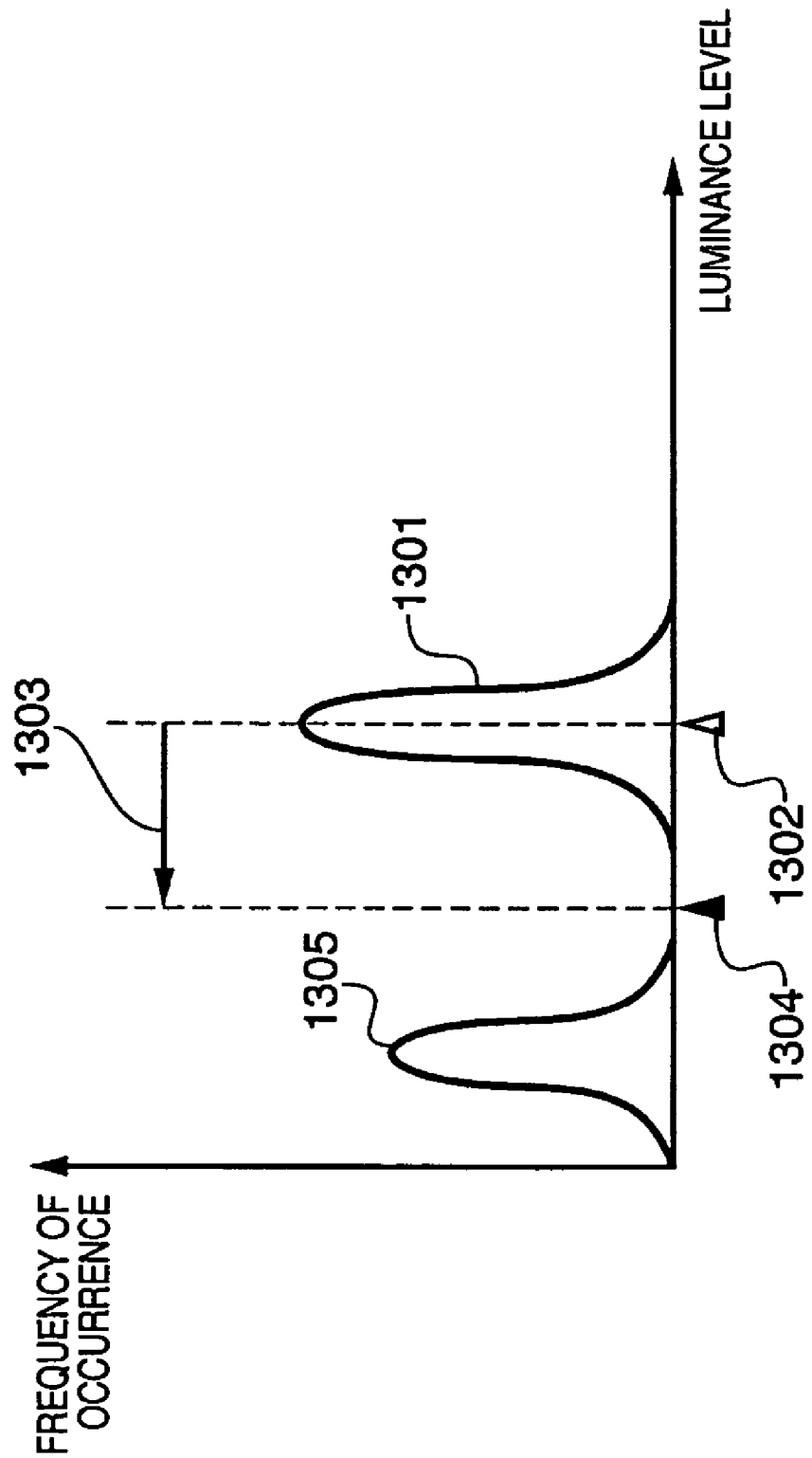
FIGS. 18 to 20 show examples of histograms.

FIG. 18 shows an example of a histogram of the original 1511, which includes two peaks corresponding to a text part 1305 and background part 1301. The text part 1305 forms a distribution with a given variance in a low-luminance range. The background part 1301 forms a distribution with a given variable in a high-luminance range, but it exists on the lower-luminance side than the background part 1201 of the original 1501. When an offset amount 1303 is subtracted from a peak value (maximum frequency of occurrence) of this background part 1301 as a background level 1302, a background removal amount has a level indicated by reference numeral 1304. As a result, the background part 1301 is completely removed, thus attaining satisfactory background removal.

Figure 19:
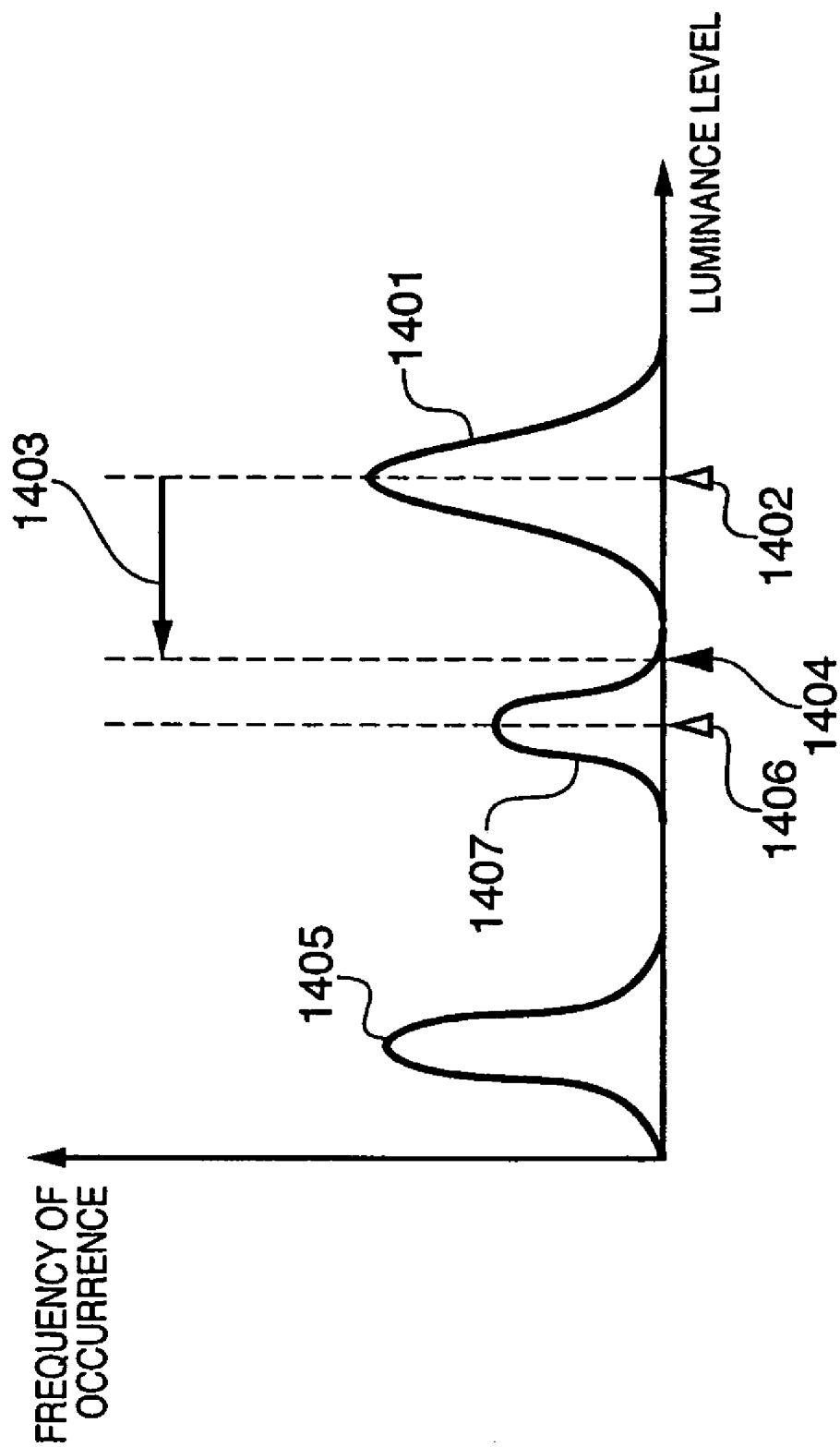

FIG. 19 shows an example of a histogram of the original 1521, which includes three peaks corresponding to a text part 1405, a background part 1401 of the white board, and a background part 1407 of the clipped original. The text part 1405 forms a distribution with a given variance in a low-luminance range. The background part 1401 of the white board forms a distribution with a given variable in a high-luminance range. Also, the background part 1407 of the clipped original forms a distribution with a given variance in a lower-luminance range than the background part 1401. In this case, since the background part 1401 exhibits a peak with a maximum frequency of occurrence, when an offset amount 1403 is subtracted from a background level 1402 of that peak, a background removal amount has a level indicated by reference numeral 1404. As a result, the background part 1401 is completely removed, but the background part 1407 is not removed. That is, satisfactory background removal cannot be attained.

Figure 20:
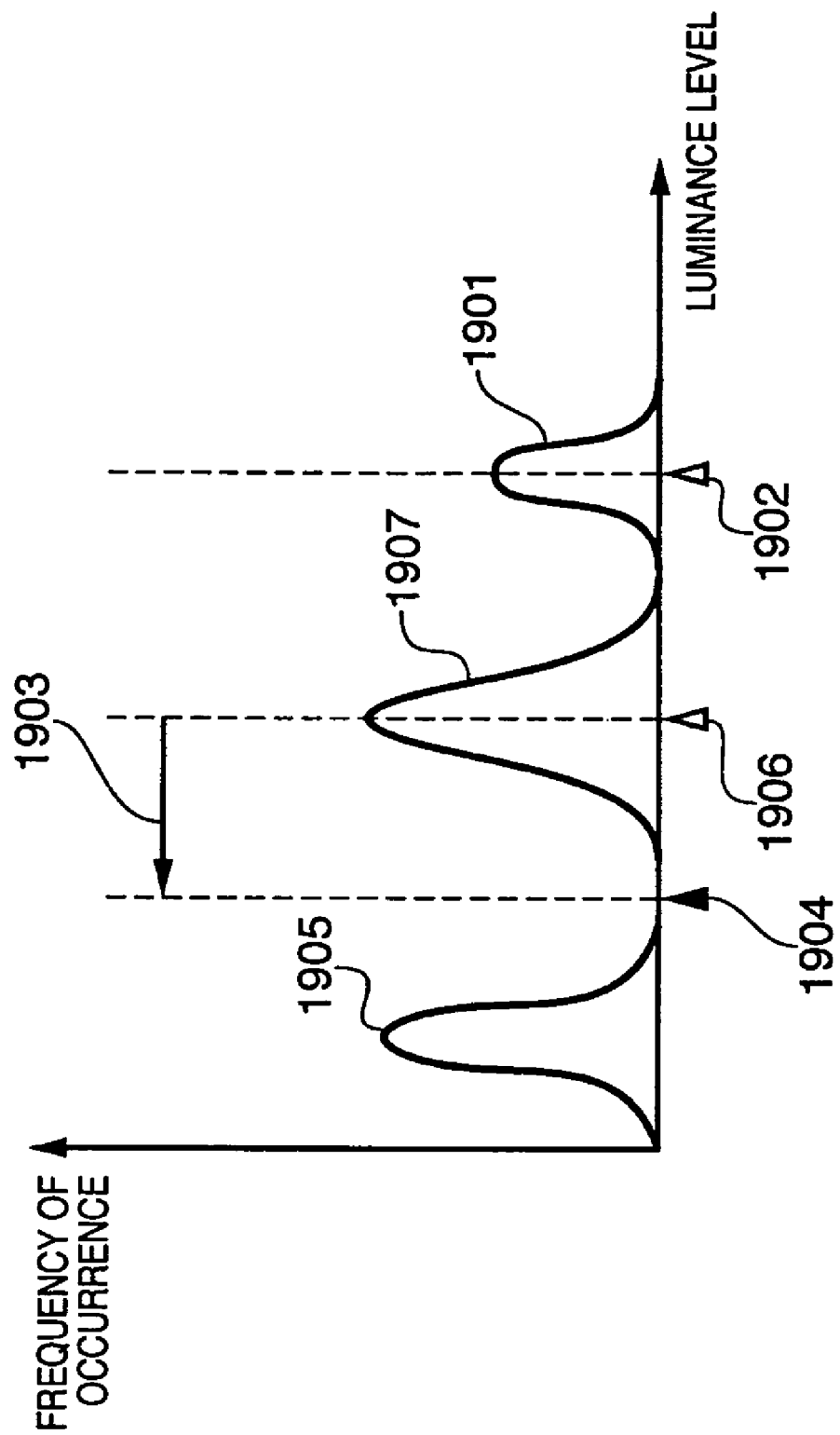

FIG. 20 shows an example of a histogram of the original 1531, which includes three peaks corresponding to a text part 1905, a background part 1901 of the white board, and a background part 1907 of the clipped original. The text part 1905 forms a distribution with a given variance in a low-luminance range. The background part 1901 of the white board forms a distribution with a given variable in a high-luminance range. Also, the background part 1907 of the clipped original forms a distribution with a given variance in a lower-luminance range than the background part 1901. In this case, since the background part 1907 exhibits a peak with a maximum frequency of occurrence, when an offset amount 1903 is subtracted from a background level 1906 of that peak, a background removal amount has a level indicated by reference numeral 1904, and the background parts 1901 and 1907 are completely removed.

In case of a uniform background like the originals 1501 and 1511 shown in FIG. 17, an appropriate background level can be detected to attain background removal. However, when the backgrounds of different colors exist together like the originals 1521 and 1531, the background level to be detected changes depending on their areas, thus producing a large difference between the background removal results. In other words, in case of an original which includes backgrounds of different colors, stable background removal cannot be done.

To solve this problem, the second embodiment performs satisfactory background removal using the data storage unit 130.

Figure 21:
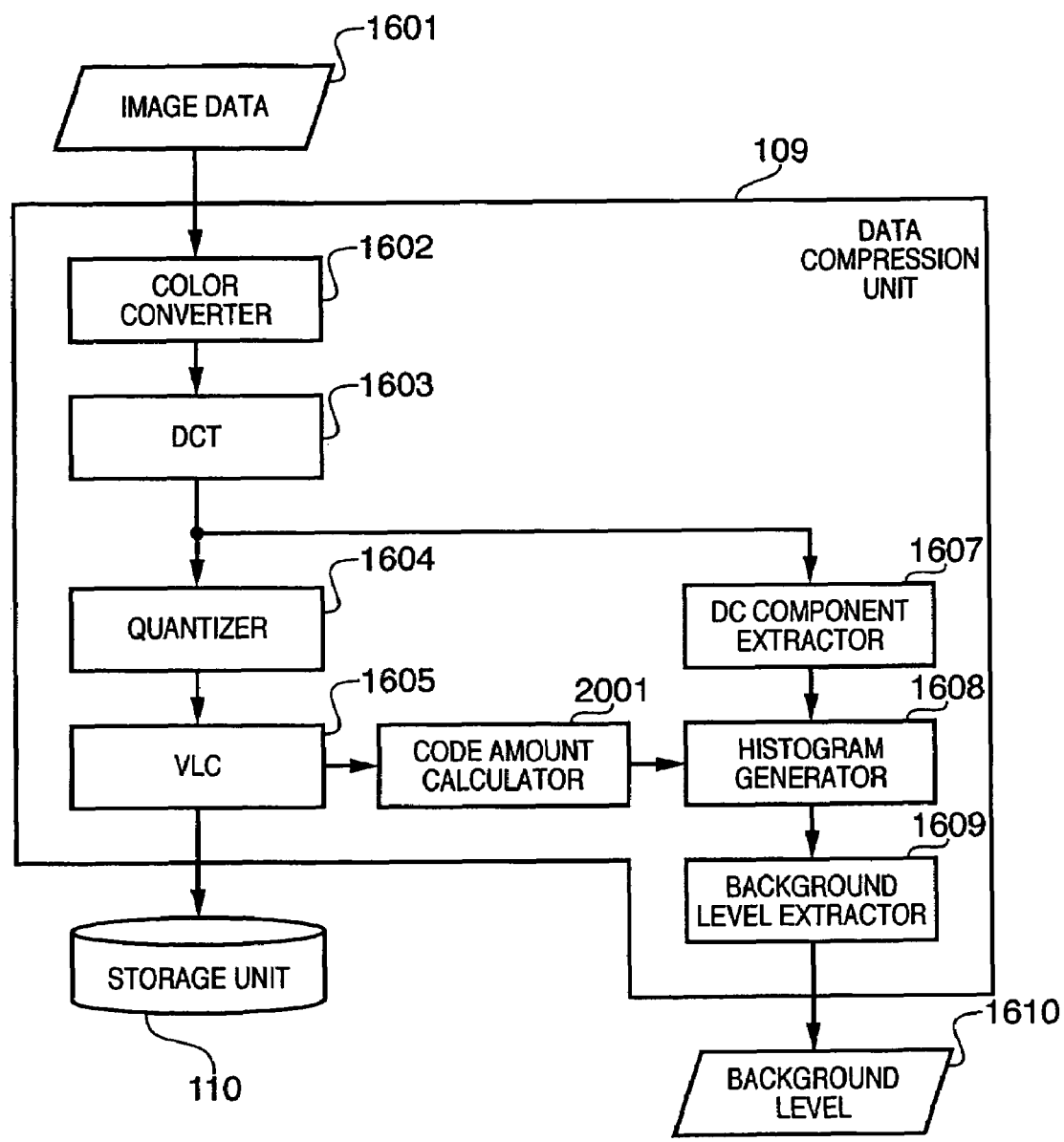
FIG. 21 is a block diagram showing the arrangement of a data compression unit according to the second embodiment of the present invention.

FIG. 21 is a block diagram showing the arrangement of the data compression unit 109 of the second embodiment.

A code amount calculator 2001 calculates a code amount from encoded data output from the VLC 1605. The histogram generator 1608 generates a histogram based on DC components extracted by the DC component extractor 1607. In this case, the generator 1608 generates a histogram based only on DC components equal to or lower than a pre-set code amount (code amount threshold) with reference to the code amount calculated by the code amount calculator 2001.

The code amount of each image block (e.g., 8×8 pixels) is influenced by the texture, density, color, and the like of that image block. An image block has a smaller code amount as it has achromatic color and no texture. Therefore, the code amount of a general white background part is considerably small. On the other hand, the background part of a newspaper or magazine has a slightly larger code amount than the white background part resulting from the texture of a surface due to paper quality. On the other hand, a part including characters and the like has a large code amount. In consideration of such characteristics, the threshold is set, and a histogram is generated using only DC components of image blocks whose code amount is equal to or larger than the code amount threshold.

Figure 22:
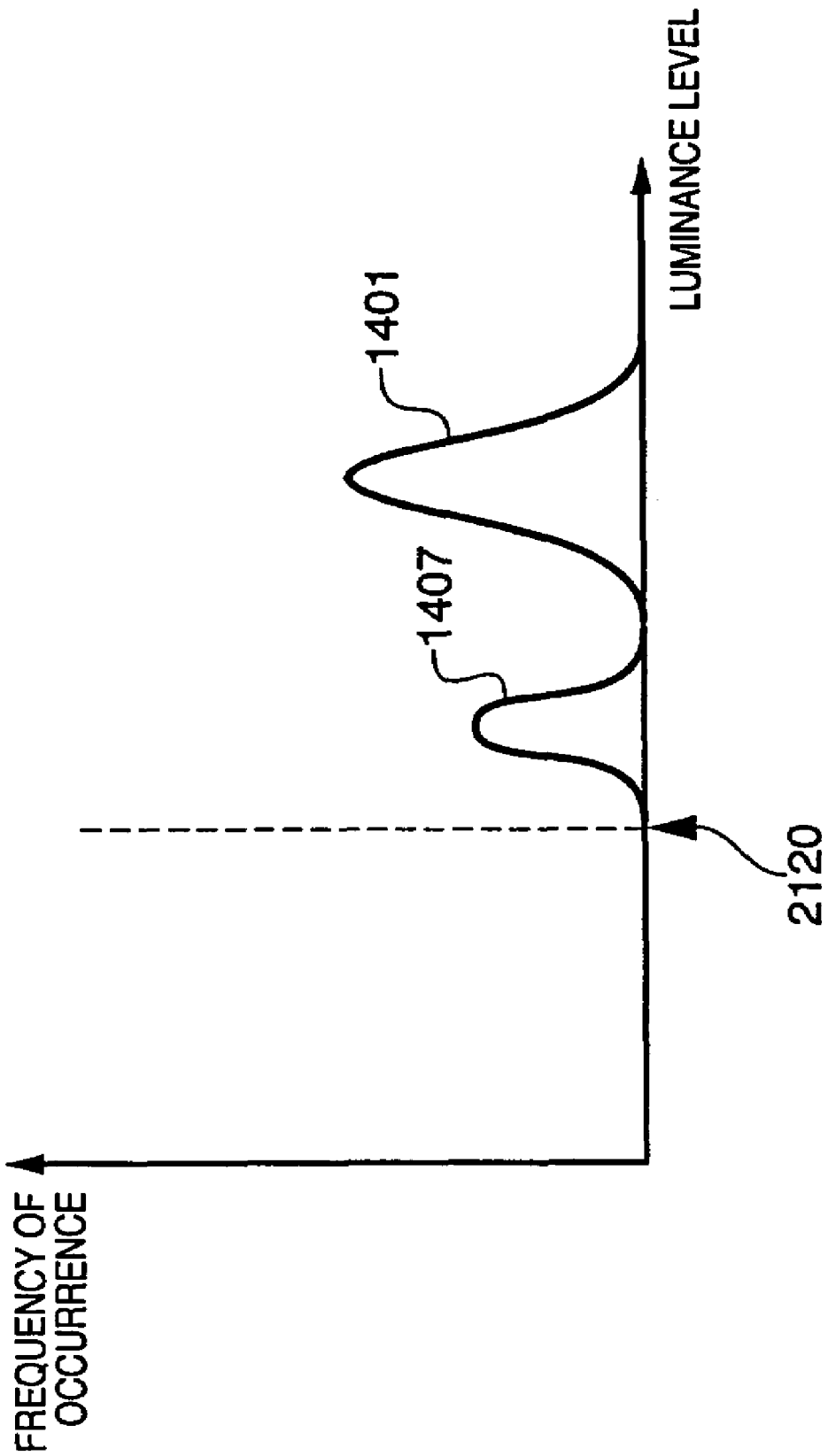
FIG. 22 shows an example of a histogram.

FIG. 22 shows an example of a luminance distribution histogram of the original 1521 generated by the data compression unit 109 of the second embodiment.

Since a histogram is generated using only DC components of image blocks with code amounts equal to or lower than the threshold, luminance areas whose background is to be removed can be accumulated in the histogram. As a result, the histogram is generated, as shown in FIG. 22, and the text part 1405 is excluded compared to the histogram shown in FIG. 19. In other words, signals of the luminance area which seems to be a background area can be used to generate a histogram. In this case, background removal can be satisfactorily performed by setting the bottom of a peak with a lowest luminance as a background removal amount 2120.

In sum, a histogram indicating a signal distribution is generated using DC components of DCT coefficients of image blocks with smaller code amounts with reference to the code amounts output from the VLC upon compression (encoding) image data. A background level is detected using this histogram to perform background removal. In this way; background removal immune to any dust image and noise can be realized as in the first embodiment. In addition, a histogram can be selectively generated from signals of a luminance area which seems to be a background area, and the background of a clip of a newspaper or the like pasted on a white board can be stably removed.

Third Embodiment

Image processing according to the third embodiment of the present invention will be described below. Note that the same reference numerals in the third embodiment denote the same parts as in the first and second embodiments, and a detailed description thereof will be omitted.

In the second embodiment, the method of determining the background removal amount by selectively generating a histogram of image blocks with smaller code amounts with reference to the code amounts of encoded data output from the VLC, i.e., a histogram which mainly includes a peak corresponding to a background part has been explained. In the third embodiment, a method of generating a histogram by further determining a non-background area even with a small code amount will be described.

As has been described in the second embodiment, an image block with a small code amount is more likely to form a background. However, in some cases, an original image includes a photo printed on photographic paper, an image printed in a photo mode of an ink-jet printer (which image has the same level of image quality as that of the photo printed on the photographic paper), and the like. In this case, there is a non-background area (e.g., a dark part like night sky of a nightscape) even when it has a small code amount depending on pictures. The dark part is not a background since it is close to achromatic color and has a small code amount due to a uniformly high density.

Since photo prints have very delicate image structures, they cannot be dissected by scanning of a scanner. Therefore, pixels upon printing cannot be discriminated when the density exceeds a given level. As a result, such pixels are equivalent to solid color, and their code amount becomes small. Beyond that, a silver halide color photo has a small code amount since it is a dye cloud. For this reason, even when the code amount is small depending on pictures, some cases are not preferable when they are determined as a background.

Hence, in the third embodiment, a histogram is generated with reference to the luminance levels of DC components in addition to the code amounts, thus determining a background more strictly. Therefore, the background level can be easily detected from the shape of the histogram.

Figure 23:
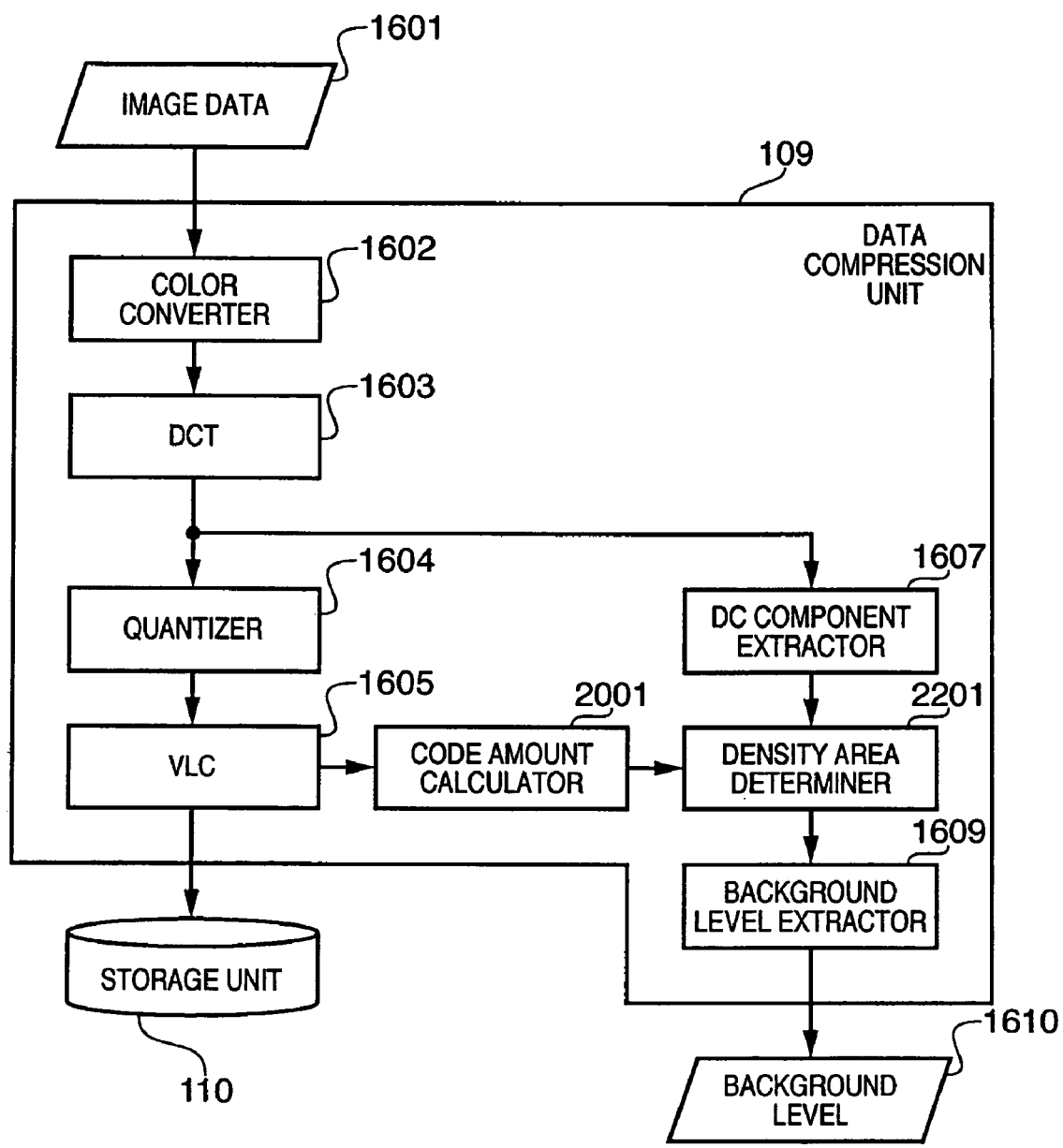
FIG. 23 is a block diagram showing the arrangement of a data compression unit according to the third embodiment of the present invention.

FIG. 23 is a block diagram showing the arrangement of the data compression unit 109 according to the third embodiment.

A density area determiner 2201 receives DC components output from the DC component extractor 1607. When each DC component is larger (luminance is higher) than a threshold (luminance threshold) which is set in advance, the density area determiner 2201 outputs the code amount output from the code amount calculator 2001 to the histogram generator 1608. On the other hand, when each DC component is smaller than the luminance threshold (luminance is lower), the density area determiner 2201 does not output any result of the code amount calculator 2001 to the histogram generator 1608. Therefore, the histogram generator 1608 generates a histogram using DC components whose values are higher than the luminance threshold, and which have code amounts equal to or lower than the code amount threshold.

In this way, a histogram is selectively generated from image data equal to or higher than the predetermined luminance, which is predicted as a background, and image data equal to or lower than the predetermined code amount, which is predicted as a background, thus detecting the background level more precisely. As a result, suited background removal can be realized. Note that the code amount threshold and luminance threshold can be independently set.

Figure 24:
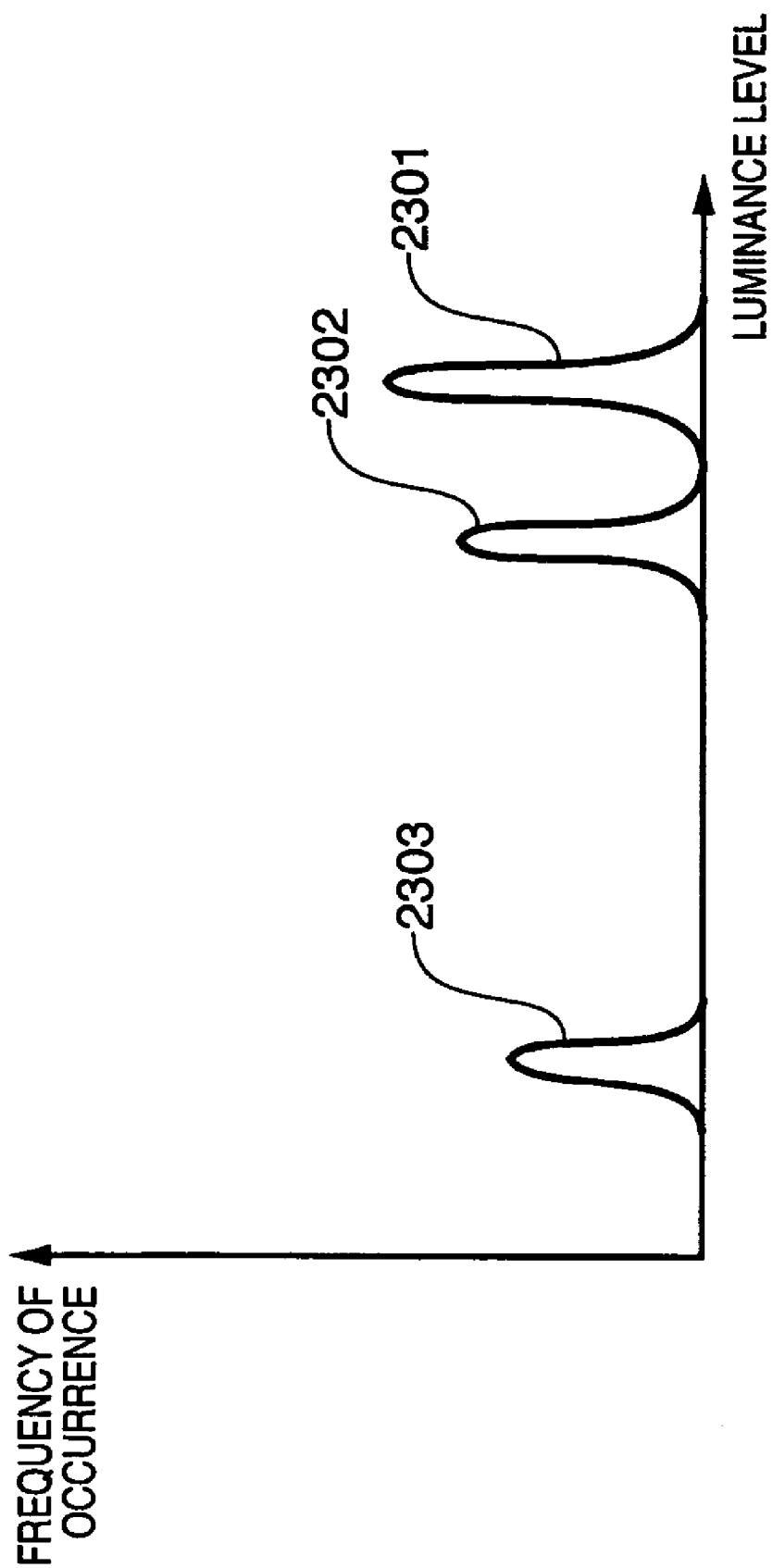
FIGS. 24 and 25 show examples of histograms.

FIG. 24 shows a histogram of an original prepared by pasting an original-clipped from a newspaper, and a nightscape photo printed on photographic paper on a white board. This histogram is selectively generated from pixel blocks which have code amounts equal to or lower than a predetermined amount irrespective of luminance levels.

The histogram shown in FIG. 24 includes three peaks: a peak 2301 corresponding to the background of a white board in a high-luminance range, a peak 2302 corresponding to the background of a newspaper on the relatively lower-luminance side than the peak 2361, and a peak 2303 corresponding to night sky of a nightscape photo in a low-luminance range. In case of such histogram, detection of the background level based on the code amount results in detection precision drop. More specifically, since peaks appear over a broad luminance range, the criterion of detection of the background levels becomes complicated.

Figure 25:
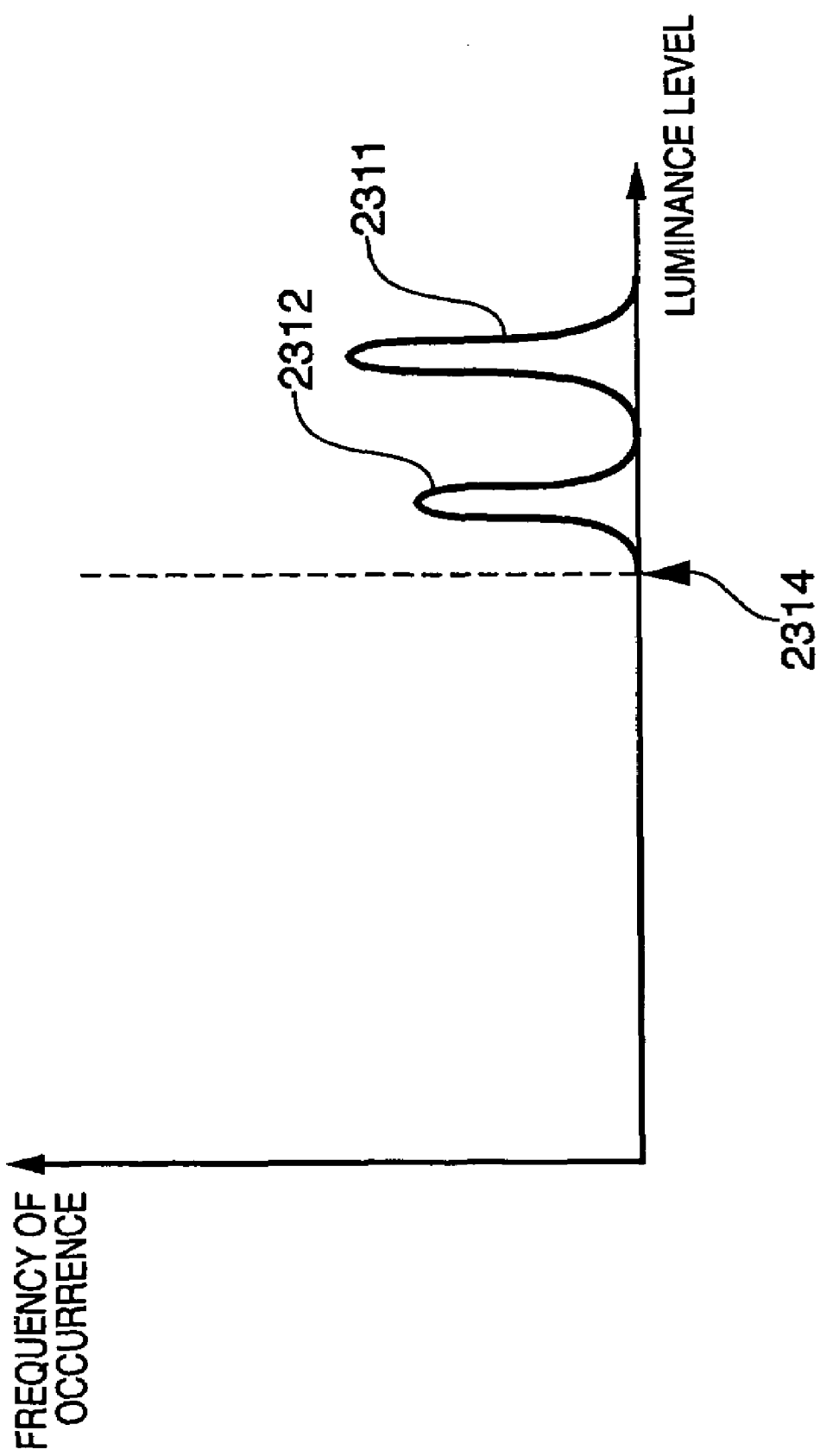

FIG. 25 shows a histogram of the same original as that in FIG. 24, which is generated by the arrangement shown in FIG. 23. A peak 2311 corresponding to the background of the white board is present in a high-luminance range, and a peak 2312 corresponding to the background of a newspaper is present on the relatively lower-luminance side than the peak 2311. This histogram does not include any peak corresponding to night sky of the nightscape photo in the low-luminance range. That is, areas to be detected as the background can be selectively accumulated in the histogram. For example, the bottom of the peak 2312 is detected as a background level (equal to the background removal amount in this case) 2314, thus realizing suitable background removal.

In this manner, since image blocks to be used to generate a histogram are selected with reference to the code amounts of encoded data output from the VLC and the DC component values upon compressing (encoding) image data, background removal with higher precision can be realized. Since a histogram is generated after the luminance area of the background is predicted, the memory size used to generate a histogram can be saved, thus contributing to savings of the memory size mounted on hardware. Of course, this embodiment contributes to savings of the memory size when it is implemented by software.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-114771, filed Apr. 12, 2005, which is hereby incorporated by reference herein in its entirety.

What is claimed is:

1. An image processing apparatus comprising:
an extractor, arranged to extract DC components of an image;
a calculator arranged to calculate code amounts of encoded data generated upon encoding the image;
a generator, arranged to generate a histogram of the DC components extracted by said extractor; and
a detector, arranged to detect a background level of the image based on the histogram,
wherein said generator generates said histogram of DC components from DC components which have corresponding code amounts calculated by said calculator not more than a predetermined amount.

2. The apparatus according to claim 1,
wherein said DC components from which said histogram is generated are not less than a predetermined value.

3. The apparatus according to claim 1, wherein the DC components extracted by said extractor are generated by two-dimensional orthogonal transformation.

4. The apparatus according to claim 1, wherein said detector detects the background level using a frequency of occurrence of the histogram, and determines a background removal amount by subtracting an offset amount from the background level.

5. An image processing apparatus comprising:
an encoder, arranged to encode an image by computing orthogonal transforms of respective image blocks each including a predetermined number of pixels;
a calculator arranged to calculate code amounts of encoded data output from said encoder;
a generator, arranged to generate a histogram based on direct-current components of orthogonal transform coefficients of the image blocks; and
a detector, arranged to detect a background level of the image based on the histogram,
wherein said generator generates said histogram based on the direct-current components of the orthogonal transform coefficients of the image blocks which have code amounts not more than a predetermined amount.

6. The apparatus according to claim 5,
wherein said direct-current components upon which the histogram is based are not more than a predetermined value.

7. The apparatus according to claim 5, further comprising:
a decoder, arranged to decode the image encoded by said encoder; and
a remover, arranged to remove a background from the image decoded by said decoder based on the background level detected by said detector.

8. The apparatus according to claim 5, wherein said generator generates the histogram based on DC components of luminance signals of the image.

9. The apparatus according to claim 5, wherein said generator generates the histogram based on DC components of color difference signals of the image.

10. The apparatus according to claim 5, wherein said generator generates the histogram based on DC components of luminance signals and color difference signals of the image.

11. An image processing method comprising the steps of:
using an image processing apparatus to perform steps including:
extracting DC components of an image;
calculating code amounts of encoded data generated upon encoding the image;
generating a histogram of the extracted DC components; and
detecting a background level of the image based on the histogram,
wherein the generating step includes a step of generating the histogram of DC components which have corresponding code amounts calculated in the calculating step not more than a predetermined amount.

12. The method according to claim 11,
wherein the DC components from which said histogram is generated have corresponding code amounts that are not less than a predetermined value.

13. An image processing method comprising the steps of:
using an image processing apparatus to perform steps including:
encoding an image by computing orthogonal transforms of respective image blocks each including a predetermined number of pixels;
calculating code amounts of encoded data output in the encoding step;
generating a histogram based on direct-current components of orthogonal transform coefficients of the image blocks; and
detecting a background level of the image based on the histogram,
wherein the generating step includes a step of generating the histogram based on the direct-current components of the orthogonal transform coefficients of the image blocks which have code amounts not more than a predetermined amount.

14. The method according to claim 13,
wherein the direct current components upon which the histogram is based are not more than a predetermined value.

15. The method according to claim 13, further comprising the steps of:
decoding the image encoded in the encoding step; and
removing a background from the image decoded in the decoding step based on the background level detected in the detecting step.

16. A computer-readable storage medium storing a computer-executable program for causing a computer to perform an image processing method, said method comprising the steps of:
extracting DC components of an image;
calculating code amounts of encoded data generated upon encoding the image;
generating a histogram of the extracted DC components; and
detecting a background level of the image based on the histogram,
wherein the generating step includes a step of generating the histogram of DC components which have corresponding code amounts calculated in the calculating step not more than a predetermined amount.

17. A computer-readable storage medium storing a computer-executable program for causing a computer to perform an image processing method, said method comprising the steps of:

encoding an image by computing orthogonal transforms of respective image blocks each including a predetermined number of pixels;

calculating code amounts of encoded data output in the encoding step;

generating a histogram based on direct-current components of orthogonal transform coefficients of the image blocks; and detecting a background level of the image based on the histogram, wherein the generating step includes a step of generating the histogram based on the direct-current components of the orthogonal transform coefficients of the image blocks which have code amounts not more than a predetermined amount.

* * * * *